United States Patent
Shiina et al.

(10) Patent No.: US 7,174,825 B2
(45) Date of Patent: Feb. 13, 2007

(54) HYDRAULIC POWER STEERING APPARATUS

(75) Inventors: Akihiko Shiina, Kashihara (JP); Yasuhiro Kamatani, Kitakaturagi-gun (JP); Toshiaki Oya, Sakai (JP); Ryouichi Tokioka, Yamatokoriyama (JP); Kazuhiro Watanabe, Yamatokoriyama (JP); Yoshimi Kotake, Kashiba (JP); Hiroji Ueda, Tenri (JP); Katsuyuki Oguchi, Kashiwara (JP); Takashi Ohata, Kitakaturagi-gun (JP); Osamu Sano, Kashihara (JP); Masayoshi Ashitaka, Katuragi (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/248,463

(22) Filed: Oct. 12, 2005

(65) Prior Publication Data

US 2006/0075747 A1 Apr. 13, 2006

(30) Foreign Application Priority Data

| Oct. 13, 2004 | (JP) | ............................. 2004-299166 |
| Jul. 15, 2005 | (JP) | ............................. 2005-207294 |
| Oct. 6, 2005 | (JP) | ............................. 2005-293620 |

(51) Int. Cl.
B62D 5/083 (2006.01)
F15B 9/10 (2006.01)

(52) U.S. Cl. ..................................... 91/375 A; 180/421
(58) Field of Classification Search .................. 60/384; 91/375 A, 389; 180/421, 441
See application file for complete search history.

(56) References Cited

U.S. PATENT DOCUMENTS 5,348,110 A * 9/1994 Klein et al. .................. 180/441
5,593,002 A 1/1997 Okada et al.
6,105,711 A * 8/2000 Maruyama et al. ......... 180/421
6,298,940 B1 10/2001 Bohner et al.
6,390,228 B2 * 5/2002 Serizawa et al. ........... 180/441

FOREIGN PATENT DOCUMENTS

| DE | 4138885 | 6/1993 |
| EP | 0701940 | 3/1996 |
| JP | 7-117694 | 5/1995 |

* cited by examiner

Primary Examiner—Thomas E. Lazo
(74) Attorney, Agent, or Firm—Jordan and Hamburg LLP

(57) ABSTRACT

In a hydraulic power steering apparatus, when the relative rotation between input and output shafts which are connected by a torsion bar is converted into the relative rotation between an outer valve element and an inner valve element, the ratio of the relative rotation angle of the latter to the relative rotation angle of the former is varied in accordance with an operating condition of a vehicle. The hydraulic pressure to generate steering assist force is controlled in accordance with the relative rotation angles between both valve elements. The outer valve element is capable of relative coaxial rotation to the input and output shafts, and the inner valve element is formed integrally with the input shaft. A swinging member is supported by first, second and third supporting parts which respectively rotate together with the input shaft, the output shaft or the outer valve element. One of the first, second and third supporting parts is displaced in the axial direction by a certain distance in accordance with the operating condition of the vehicle.

10 Claims, 17 Drawing Sheets

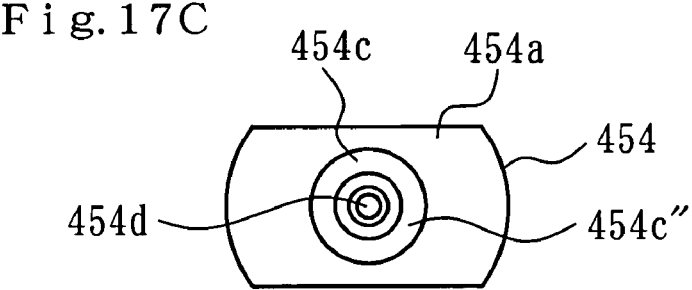
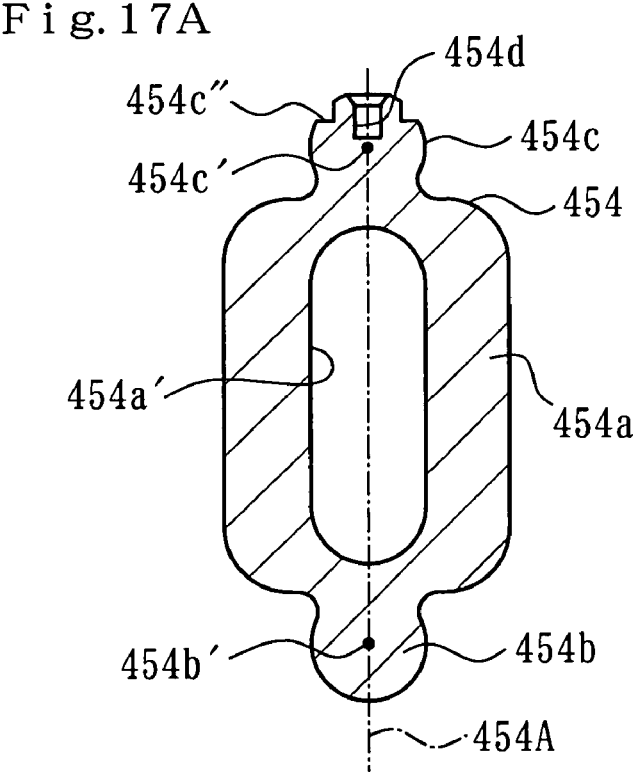
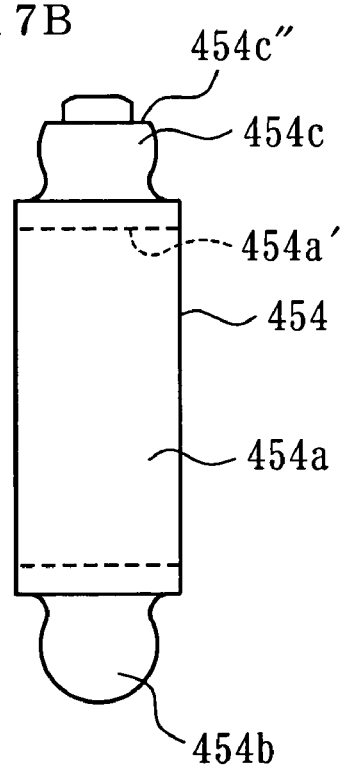

HYDRAULIC POWER STEERING APPARATUS

FIELD OF THE INVENTION

The present invention relates to a hydraulic power steering apparatus in which steering assist characteristics are varied by the twisting of a torsion bar in accordance with the steering torque.

DESCRIPTION OF THE RELATED ART

A hydraulic power steering apparatus, in which an input shaft connected to the steering wheel and an output shaft connected to the vehicle wheels used for steering via a rack and pinion type steering gear or the like are coaxially connected by a torsion bar so as to be capable of elastic relative rotation in accordance with the steering torque, and the pressure of the hydraulic fluid supplied to a steering assist pressure generating hydraulic actuator is controlled by rotating an inner valve element relatively to a tubular outer valve element into which the inner valve element is fitted coaxially in accordance with the relative rotation angle between the input and output shafts, has been used in the past.

In order to improve the steering characteristics in such a hydraulic power steering apparatus, it was proposed to make the ratio of the relative rotation angle between the two valve elements to the torsion angle of the torsion bar variable (see Japanese Patent Application Laid-Open No. 1995-117694). In this conventional example, a tubular inner valve element is fitted to the outer circumference of the input shaft so that relative rotation is possible, a tubular outer valve element is fitted to the outer circumference of the inner valve element so that relative rotation is possible, the outer valve element is fastened to the output shaft, and conversion ratio at the time when the relative rotation between the input and output shafts is converted into the relative rotation between the two valve elements is varied in accordance with operating condition such as the vehicle speed or the like.

SUMMARY OF THE INVENTION

In the hydraulic power steering apparatus of the abovementioned conventional example, it is necessary to cause relative coaxial rotation of both the outer valve element and inner valve element to the input shaft; therefore, the number of parts is increased. Furthermore, in order to cause smooth relative coaxial rotation between these three parts, i.e., the input shaft, outer valve element and inner valve element, machining in high degree of concentric precision is required, so that the problem of increased machining costs also arises.

Furthermore, in the abovementioned conventional example, a transmission pin is supported by sphericalsurface bearings provided on these three parts, and the ratio of the relative rotation angle between the input and output shafts to the relative rotation angle between the two valve elements is varied by varying the distances between these support points. In this case, the spherical-surface bearing which rotates together with the input shaft is disposed between the spherical-surface bearing which rotates together with the outer valve element and the spherical-surface bearing which rotates together with the inner valve element in the axial direction of the input and output shafts. Since the twisting of the torsion bar is caused by the steering force of the driver correlated with the frictional resistance between road and tires contacting to the road, the spherical-surface bearing which rotates together with the input shaft constitutes the force point of the transmission pin, the sphericalsurface bearing which rotates together with the outer valve element constitutes the fulcrum, and the spherical-surface bearing which rotates together with the inner valve element constitutes the action point. Specifically, since the fulcrum of the transmission pin is not located between the force point and the action point in the axial direction of the input and output shafts, the support balance of the transmission pin is poor, so that the relative displacement of the action point located on one end of the transmission pin to the fulcrum located on the other end is increased. Consequently, there is a problem that smooth relative rotation between the two valve elements is impeded by rubbing at the supporting parts of the transmission pin and between the two valve elements, so that steering assist cannot be performed quickly and the quality of the steering feeling deteriorates.

It is an object of the present invention to provide a hydraulic power steering apparatus that can solve the abovementioned problem in the prior art.

The present invention is a hydraulic power steering apparatus characterized by comprising an input shaft; an output shaft; a torsion bar which connects the input shaft with the output shaft coaxially so that elastic relative rotation between the shafts is generated in accordance with steering torque; a hydraulic actuator for generating steering assist force; a hydraulic control valve having a tubular outer valve element and an inner valve element which is fitted into the outer valve element so as to be capable of relative coaxial rotation; a rotation conversion mechanism which converts the relative rotation between the input and output shafts into relative rotation between the two valve elements; and a rotation ratio altering mechanism which varies the ratio of the relative rotation angle between the two valve elements to the relative rotation angle between the input and output shafts in accordance with an operating condition of a vehicle; wherein the pressure of the hydraulic fluid supplied to the hydraulic actuator is controlled in accordance with the relative rotation angle between the two valve elements, the outer valve element is capable of relative coaxial rotation to the input shaft and the output shaft, the inner valve element is formed integrally with the input shaft, the rotation conversion mechanism has a first supporting part which rotates together with the input shaft, a second supporting part which rotates together with the output shaft, a third supporting part which rotates together with the outer valve element, and a swinging member, the respective supporting parts are spaced from each other in the axial direction of the input and output shafts, the swinging member is supported by the first supporting part and the second supporting part so as to swing in accordance with the relative rotation between the input and output shafts, and is supported by the third supporting part so that relative rotation between the outer valve element and the inner valve element is generated by the swinging of the swinging member, and relative displacement of one of the first, second and third supporting parts in the axial direction to the input and output shafts by a distance corresponding to the operating condition of the vehicle is generated by means of the rotation ratio altering mechanism.

In the present invention, as a result of the relative rotation between the input and output shafts, relative displacement of the second supporting part which rotates together with the output shaft in the circumferential direction to the first supporting part which rotates together with the input shaft is generated, so that the swinging member which is supported by the first supporting part and the second supporting part swings. As a result of the swinging of this swinging member, relative rotation of the outer valve element which rotates together with the third supporting part supporting the swinging member to the inner valve element which rotates together with the input shaft is generated. As a result of relative displacement of one of the first, second and third supporting parts in the axial direction to the input and output shafts by a distance corresponding to the operating condition of the vehicle, the distances between the respective supporting parts vary. The amount of swinging of the swinging member on the third supporting part varies in accordance with the variation in the distances between the respective supporting parts. Since the amount of swinging of the swinging member on the third supporting part corresponds to the relative rotation angle between the two valve elements, the ratio of the relative rotation angle between the two valve elements to the relative rotation angle between the input and output shafts varies in accordance with the operating condition of the vehicle. Accordingly, the stability of straight forward motion can be improved by using a torsion bar with a large rigidity, and the steering performance can be improved by varying the steering assist force in accordance with the operating condition. In this case, it is not necessary to cause coaxial relative rotation between these three parts, i.e., the outer valve element, inner valve element and input shaft, it is sufficient to cause relative rotation of the outer valve element to the integrated input shaft and inner valve element. As a result, the number of parts is not increased, and machining in a high degree of concentric precision is not required in comparison with the abovementioned conventional example in which coaxial relative rotation of the three parts are required.

It is desirable that relative displacement of one of the first supporting part and the second supporting part in the axial direction to the input and output shafts is restricted, while the other of the supporting parts is displaced relatively to the input and output shafts in the axial direction by the rotation ratio altering mechanism, relative displacement of the third supporting part in the axial direction to the outer valve element is restricted, relative displacement of the one of the first supporting part and the second supporting part to the swinging member and relative displacement of the third supporting part to the swinging member are restricted in the axial direction of the input and output shafts, and relative displacement of the outer valve element in the axial direction to the inner valve element is made possible, so that variation of distance between the third supporting part and the one of the first supporting part and the second supporting part in the axial direction of the input and output shafts is allowed by the swinging of the swinging member. As a result, even if the distance between the third supporting part and the one of the first supporting part and the second supporting part in the axial direction of the input and output shafts is varied by the swinging of the swinging member, this variation is absorbed by the relative displacement of the outer valve element in the axial direction to the inner valve element. Accordingly, the swinging member can be swung smoothly without generating rubbing at the supporting parts.

It is desirable that relative displacement of one of the first supporting part and the second supporting part in the axial direction to the input and output shafts is restricted, while the other of the supporting parts is displaced relatively to the input and output shafts in the axial direction by the rotation ratio altering mechanism, relative displacement of the third supporting part in the axial direction to the outer valve element is restricted, variation of distance between the third supporting part and the one of the first supporting part and the second supporting part in the axial direction of the input and output shafts is restricted, relative displacement of the swinging member to the third supporting part in the axial direction of the input and output shafts is made possible, an elastic member is interposed between the third supporting part and the swinging member, and the elastic member is elastically deformed in accordance with the relative displacement of the swinging member in the axial direction of the input and output shafts to the third supporting part by the swinging of the swinging member. As a result, even if the relative displacement of the swinging member in the axial direction of the input and output shafts to the third supporting part is generated by the swinging of the swinging member, this relative displacement is absorbed by the elastic deformation of the elastic member. Therefore, looseness of the outer valve element is prevented, and the swinging member can be smoothly swung without generating rubbing at the respective supporting parts.

It is desirable that the supporting part which is displaced in the axial direction by the rotation ratio altering mechanism has a moving body which is capable of relative movement in the axial direction to the input and output shafts, and a receiving part which is held by the moving body so as to be able to rotate about an axis perpendicular to the axis of the input and output shafts, and the swinging member is supported by the supporting part which is displaced in the axial direction by the rotation ratio altering mechanism via the receiving part. Consequently, the swinging member can be swung smoothly by the rotation of the receiving part about an axis perpendicular to the axis of the input and output shafts as a result of the swinging of the swinging member.

It is desirable that the supporting part which is displaced in the axial direction by the rotation ratio altering mechanism has a moving body which is capable of relative movement in the axial direction to the input and output shafts, and a receiving part which has an axis perpendicular to the axis of the input and output shafts and is integrated with the moving body, that the swinging member has a slot, that the receiving part is inserted into this slot with a gap, and that the swinging member is supported by the supporting part which is displaced in the axial direction by the rotation ratio altering mechanism via the inner circumference of the slot and the outer circumference of the receiving part. As a result, since the receiving part is integrated with the moving body, no relative displacement of the receiving part to the moving body occurs. Consequently, looseness of the swinging member to the supporting part can be suppressed by minimizing the difference between the width of the slot of the swinging member and the diameter of the receiving part. As a result, fluctuations in the steering assist force generated by relative rotation between the two valve elements due to the swinging of the swinging member can be reduced, so that fluctuations in the steering torque can be suppressed.

It is desirable that the supporting part which is displaced in the axial direction by the rotation ratio altering mechanism has a moving body which is capable of relative movement in the axial direction to the input and output shafts, a circumferential groove which is concentric with the input and output shafts is formed in the outer circumference of the moving body, the rotation ratio altering mechanism has a connecting member of which relative movement in the axial direction to the input and output shafts is generated in accordance with the operating condition of a vehicle, and the connecting member is inserted into the circumferential groove via a rolling bearing which has an axis perpendicular to the axis of the input and output shafts. As a result, friction between the connecting member and the circumferential groove can be reduced, so that the input and output shafts can be rotated smoothly. Furthermore, the play between the connecting member and the circumferential groove can be reduced, so that the generation of a large percussive noise can be prevented when the moving body is moved in the axial direction of the input and output shafts.

It is desirable that one of the input shaft, the output shaft, and the outer valve element rotates together with the supporting part which is displaced in the axial direction by the rotation ratio altering mechanism, and is connected with the supporting part which is displaced by the rotation ratio altering mechanism in the axial direction via grooves formed along the axial direction of the input and output shafts and balls rotatably inserted into the groove so that relative movement in the axial direction of the input and output shafts is allowed. As a result, when the ratio of the relative rotation angle between the two valve elements to the relative rotation angle between the input and output shafts is varied, the moving body can be moved smoothly in the axial direction of the input and output shafts.

It is desirable that the second supporting part is disposed between the first supporting part and the third supporting part in the axial direction of the input and output shafts. Here, the first supporting part which rotates together with the input shaft constitutes the force point of the swinging member, the second supporting part which rotates together with the output shaft constitutes the fulcrum of the swinging member, and the third supporting part which rotates together with the outer valve element constitutes the action point of the swinging member. As a result, since the fulcrum of the swinging member is disposed between the force point and the action point in the axial direction of the input and output shafts, the swinging member is supported in good balance, and the relative displacement of the action point to the fulcrum is small in comparison with a case where the fulcrum is disposed at one end of the swinging member. Accordingly, rubbing at the respective supporting parts of the swinging member and between the two valve elements can be prevented, so that smooth relative rotation between the two valve elements can be achieved, thus making it possible to perform a quick steering assist and to improve the feeling of steering.

In the hydraulic power steering apparatus of the present invention, it is desirable that the apparatus comprise a housing; and a cylindrical sealing body which is inserted into the housing, wherein the outer valve element is inserted into the sealing body so that relative coaxial rotation is possible, hydraulic fluid passages are formed in the housing, the sealing body and the outer valve element, a plurality of sealing rings made of elastic material are interposed between the inner circumference of the housing and the outer circumference of the sealing body with spaces left in the axial direction, openings of the hydraulic fluid passages in the inner circumference of the housing and openings of the hydraulic fluid passages in the outer circumference of the sealing body are disposed between the plurality of sealing rings in the axial direction, a slight gap in the radial direction is formed between the inner circumferential surface of the sealing body and the outer circumferential surface of the outer valve element, and the gap in the radial direction is set so that there is no leakage of hydraulic fluid from between the hydraulic fluid passages of the sealing body and the hydraulic fluid passages of the outer valve element.

In a case where the outer valve element is inserted directly into the housing, if sealing rings are interposed between the outer valve element and the housing, friction which impedes the rotation of the outer valve element is generated between the sealing rings and the housing or between the sealing rings and the outer valve element. Consequently, since smooth swinging of the swinging member is impeded when the steering direction is switched, the hysteresis of the steering assist force to variation in the steering angle is increased, and fluctuations in the steering assist force caused by stick-slip movement at the frictional interface are generated. Furthermore, even if the sealing rings are eliminated by forming a slight gap in the radial direction between the outer circumference of the outer valve element and the inner circumference of the housing, because there are assembly tolerance and machining tolerance, it is difficult to assure the degree of concentric alignment between the outer valve element and the bearing or the like supporting the input and output shafts during assembly, so that assembly becomes substantially difficult.

On the other hand, by interposing a sealing body between the housing and the outer valve element, and forming a slight gap in the radial direction between the inner circumference of this sealing body and the outer circumference of the outer valve element, it is possible to prevent the rotation of the outer valve element from being impeded by friction. Furthermore, by interposing sealing rings made of elastic material between the inner circumference of the housing and the outer circumference of the sealing body, it is possible to ensure the concentric alignment between the outer valve element and the bearing or the like supporting the input and output shafts by the elastic deformation of the sealing ring. Accordingly, increase in the hysteresis of the steering assist force to variations in the steering angle and fluctuations in the steering assist force can be prevented, so that the feeling of steering can be improved.

The present invention makes it possible to reduce the number of parts, reduce the machining cost, ensure smooth operation and improve the steering feeling in a hydraulic power steering apparatus in which the ratio of the relative rotation angle between the valve elements to the torsion angle of the torsion bar is variable.

BRIEF DESCRIPTION OF THE DRAWINGS

FIG. 17A is a sectional front view of the swinging member in the hydraulic power steering apparatus of the fifth embodiment of the present invention, FIG. 17B is a side view of the same, and FIG. 17C is a plan view of the same.

DESCRIPTION OF THE PREFERRED EMBODIMENTS

Figure 1:
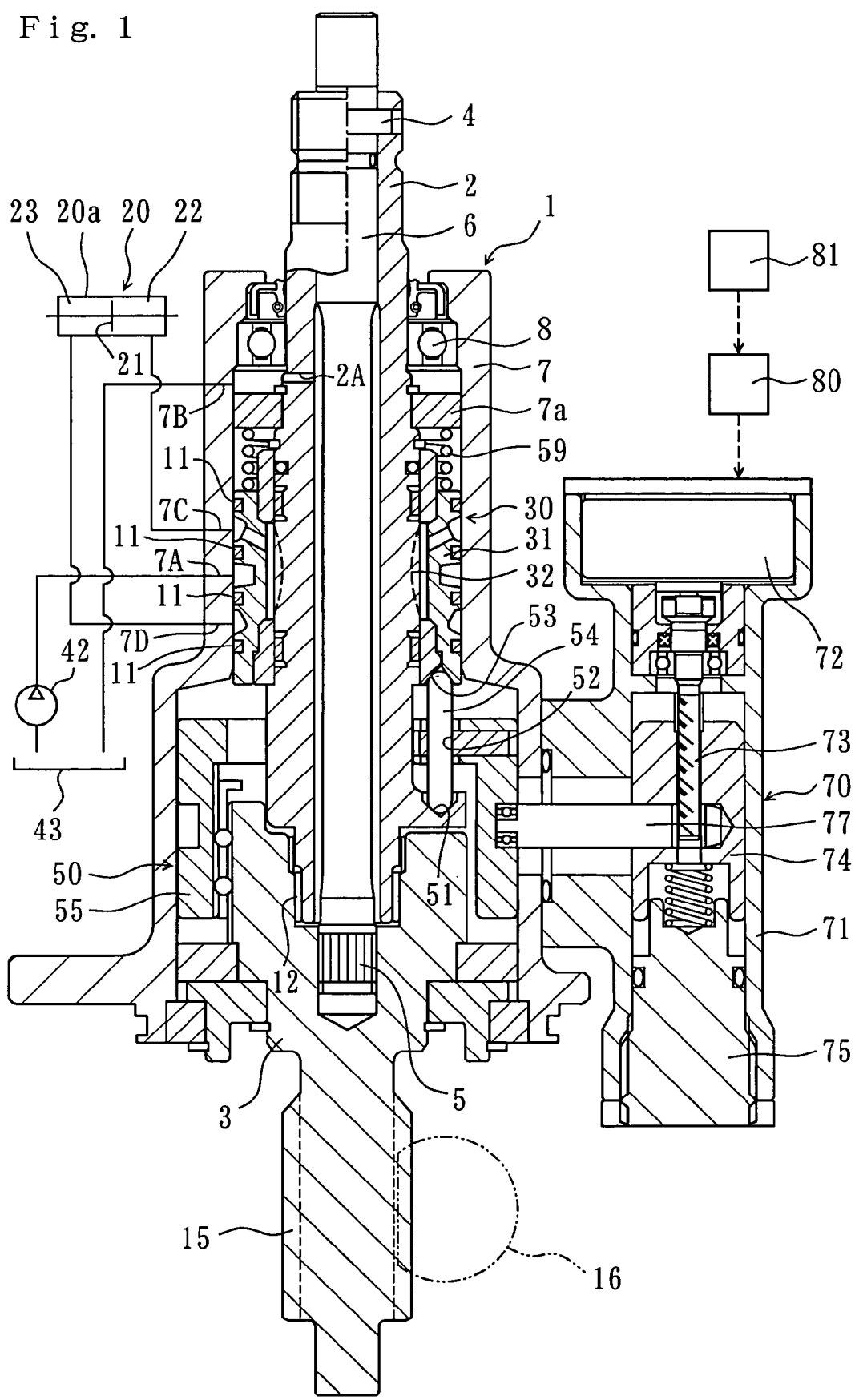
FIG. 1 is a longitudinal sectional view of a hydraulic power steering apparatus constituting a first embodiment of the present invention.

The rack and pinion type hydraulic power steering apparatus 1 of the first embodiment of the present invention comprises a tubular input shaft 2 which is connected to the steering wheel (not shown in the figures) of the vehicle, an output shaft 3, and a torsion bar 6 which connects the input shaft 2 with the output shaft 3 coaxially so that elastic relative rotation between these shafts is generated in accordance with the steering torque. The torsion bar 6 passes through the input shaft 2, and one end thereof is connected to the input shaft 2 via a pin 4 so as to rotate together with the input shaft 2 coaxially. The other end of the torsion bar 6 is inserted into a recessed part formed in one end of the output shaft 3, and is connected to the output shaft 3 by press fitting via serrations 5 so as to rotate together with the output shaft 3 coaxially. As a result, relative movement in the axial direction between the input shaft 2 and the output shaft 3 is restricted.

One end of the input shaft 2 is supported by the housing 7 via a bearing 8, while the other end is supported by the inner circumference of the recessed part of the output shaft 3 via a bush 12. The output shaft 3 is supported by the housing of a rack and pinion type steering gear (not shown in the figures) so as to be rotatably. A pinion 15 is integrally formed on the outer circumference of the other end side of the output shaft 3. The steering gear has a rack 16 which engages with the pinion 15, and the vehicle wheels are connected to the respective ends of the rack 16 via tie rods, knuckle arms and others. As a result, the rotation of the input shaft 2 caused by steering operation is transmitted to the output shaft 3 via the torsion bar 6 so that the pinion 15 rotates, and the steering angle is varied by the movement of the rack 16 in the lateral direction of the vehicle.

A hydraulic cylinder 20 is provided as a hydraulic actuator to generate steering assist force. The hydraulic cylinder 20 comprises a cylinder tube 20a and a piston 21 integrated with the rack 16, and oil chambers 22 and 23 which are partitioned by the piston 21 formed inside the cylinder tube 20a.

A rotary type hydraulic control valve 30 which controls the hydraulic pressure of the hydraulic fluid supplied to the hydraulic cylinder 20 is provided. The control valve 30 has a tubular outer valve element 31 and an inner valve element 32 which is fitted into the outer valve element 31 so as to be capable of relative coaxial rotation. The outer valve element 31 is inserted into the housing 7 so as to be capable of relative coaxial rotation to the input and output shafts 2 and 3. The inner valve element 32 rotates coaxially together with the input shaft 2 as a result of being formed integrally with the input shaft 2.

The hydraulic pressure of the hydraulic fluid supplied to the hydraulic cylinder 20 is controlled in accordance with the relative rotation angle between the two valve elements 31 and 32.

Specifically, a connecting port 7A connected to a hydraulic fluid discharge pump 42, a connecting port 7B connected to a tank 43, a connecting port 7C connected to the one 22 of the oil chambers of the hydraulic cylinder 20, and a connecting port 7D connected to the other oil chamber 23 are formed in the housing 7, and the respective ports communicate with each other via flow passages between the outer valve element 31 and inner valve element 32.

Figure 2:
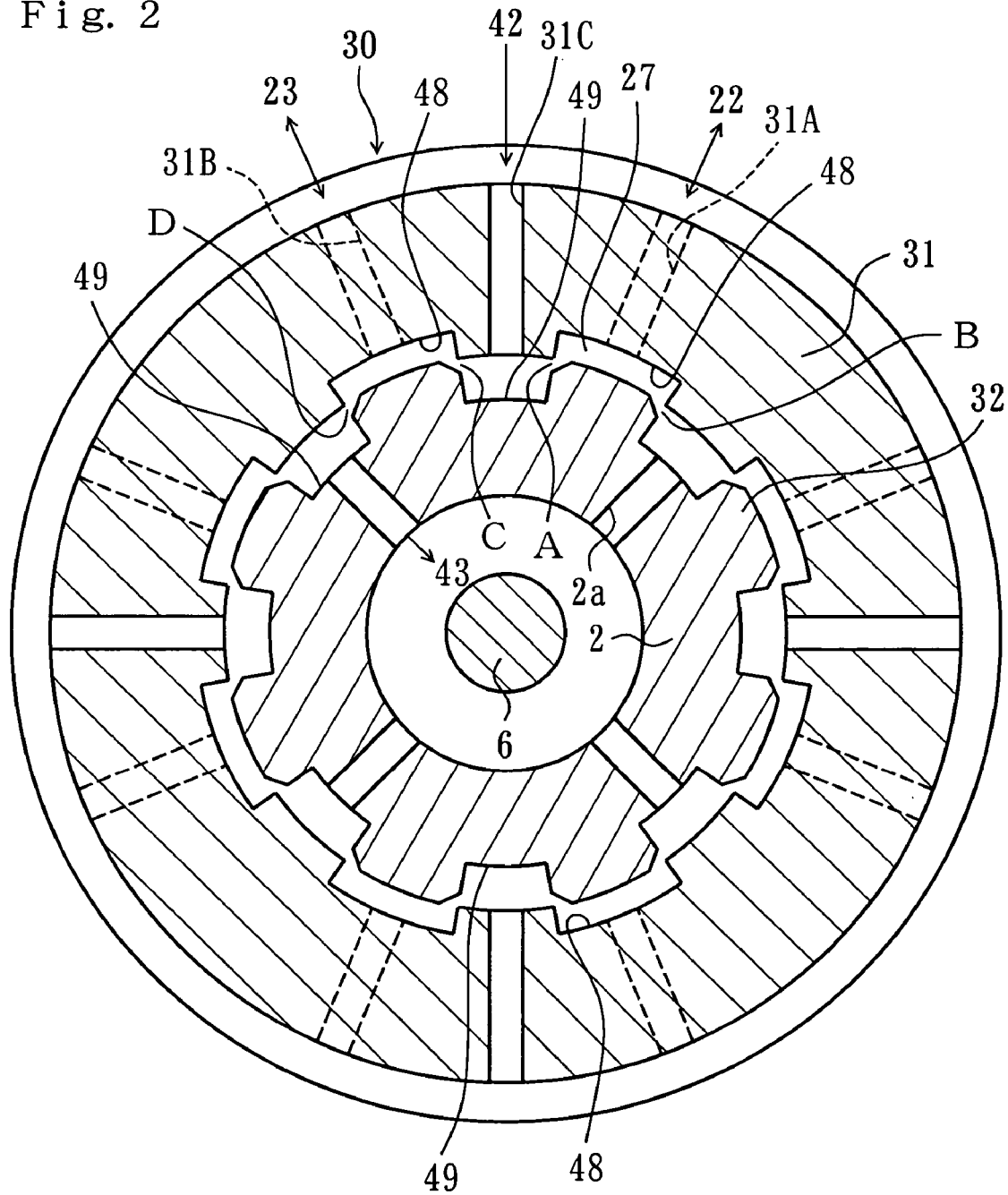
FIG. 2 is a cross sectional view of the control valve in the hydraulic power steering apparatus of the embodiments of the present invention.
Figure 3:
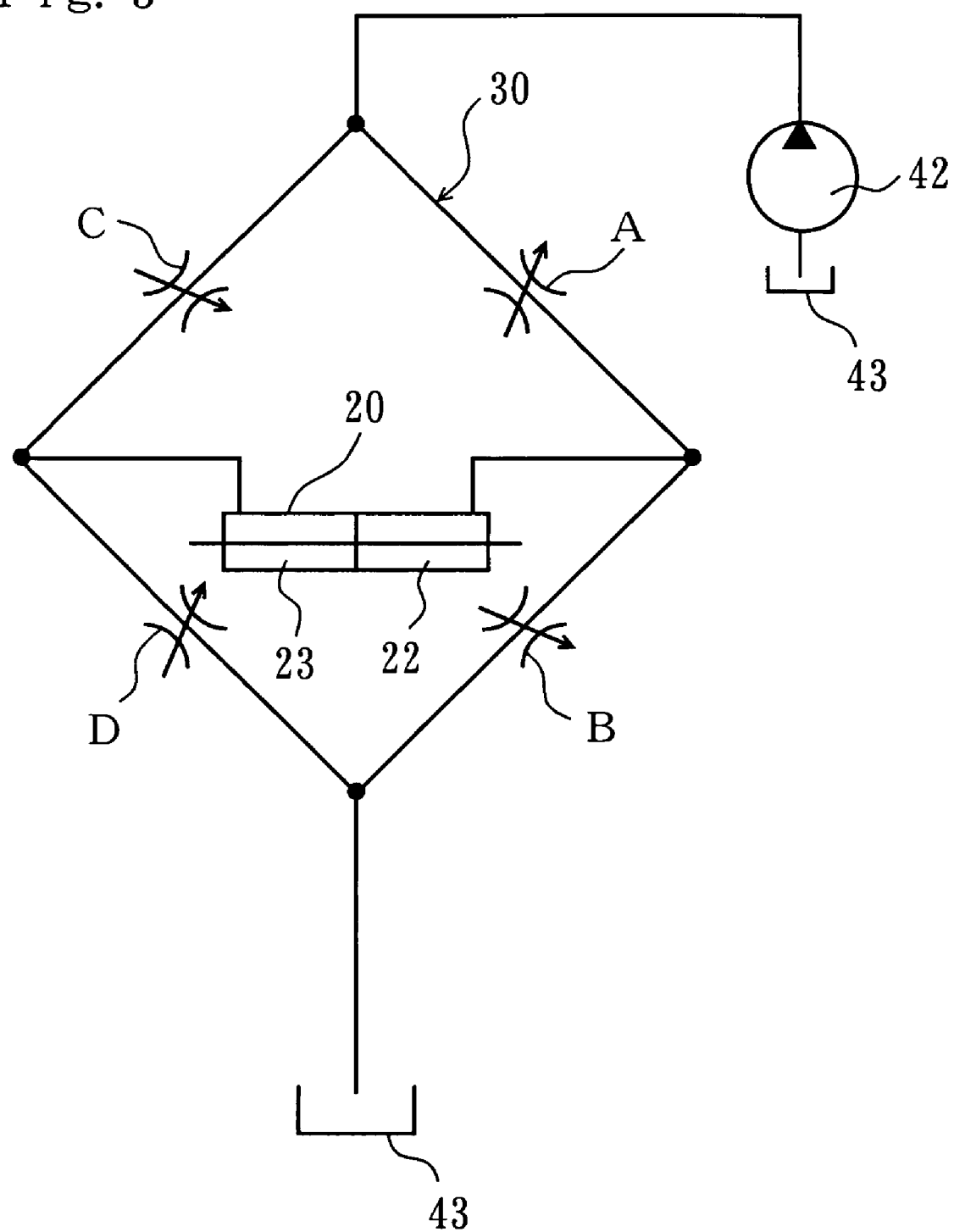
FIG. 3 is a diagram showing the hydraulic circuit in the hydraulic power steering apparatus of the embodiments of the present invention.

The degree of opening of throttle parts in the flow passages between the two valve elements 31 and 32 varies in accordance with the relative rotation angle between the two valve elements 31 and 32. As shown in FIG. 2, for example, the spaces between the edges in the axial direction of a plurality of first grooves 48 in the inner circumference of the outer valve element 31 and the edges in the axial direction of a plurality of second grooves 49 in the outer circumference of the inner valve element 32 serve as throttle parts A, B, C and D. First grooves 48 which communicate with the one 22 of the oil chambers via a hydraulic fluid flow passage 31A formed in the outer valve element 31 and the port 7C formed in the housing 7 are spaced alternately with first grooves 48 which communicate with the other oil chamber 23 via a hydraulic fluid flow passage 31B formed in the outer valve element 31 and the port 7D formed in the housing 7 in the circumferential direction. Second grooves 49 which communicate with the pump 42 via a hydraulic fluid flow passage 31C formed in the outer valve element 31 and the port 7A formed in the housing 7 are spaced alternately with second grooves 49 which communicate with the tank 43 via a through-hole 2a formed in the input shaft 2, a space between the torsion bar 6 and input shaft 2, a through-hole 2A (see FIG. 1) formed in the input shaft 2 and the port 7B formed in the housing 7 in the circumferential direction. As a result, the hydraulic circuit shown in FIG. 3 is constructed. Furthermore, a plurality of sealing rings 11 (four sealing rings in the present embodiment) made of elastic material are interposed between the inner circumference of the housing 7 and the outer circumference of the outer valve element 31 with spaces left in the axial direction, so that leakage of the hydraulic fluid is prevented.

When steering operation is not being performed, the respective throttle parts A, B, C and D are opened, so that the hydraulic pressure is not elevated. Accordingly, no steering assist force is generated. In the case of steering to the right, the degree of opening of the throttle parts A and D is increased and the degree of opening of the throttle parts B and C is reduced in accordance with the relative rotation angle between the two valve elements 31 and 32, so that pressurized hydraulic fluid is supplied to the one 22 of the oil chambers, and hydraulic fluid is circulated from the other oil chamber 23 to the tank 43, thus causing the hydraulic cylinder 20 to generate steering assist force in the rightward direction in accordance with the relative rotation angle. In the case of steering to the left, the direction of relative rotation between the two valve elements is the opposite of that seen in the case of steering to the right, and therefore the respective degrees of opening of the throttle parts A, B, C and D are the opposite of those seen in the case of steering to the right, so that the hydraulic cylinder 20 generates steering assist force in the leftward direction in accordance with the relative rotation angle.

A rotation conversion mechanism 50 which converts the relative rotation between the input and output shafts 2 and 3 into relative rotation between the two valve elements 31 and 32 is provided, and a rotation ratio altering mechanism 70 which varies the ratio of the relative rotation angle between the two valve elements 31 and 32 to the relative rotation angle between the input and output shafts 2 and 3 in accordance with an operating condition of the vehicle is also provided.

Figure 4:
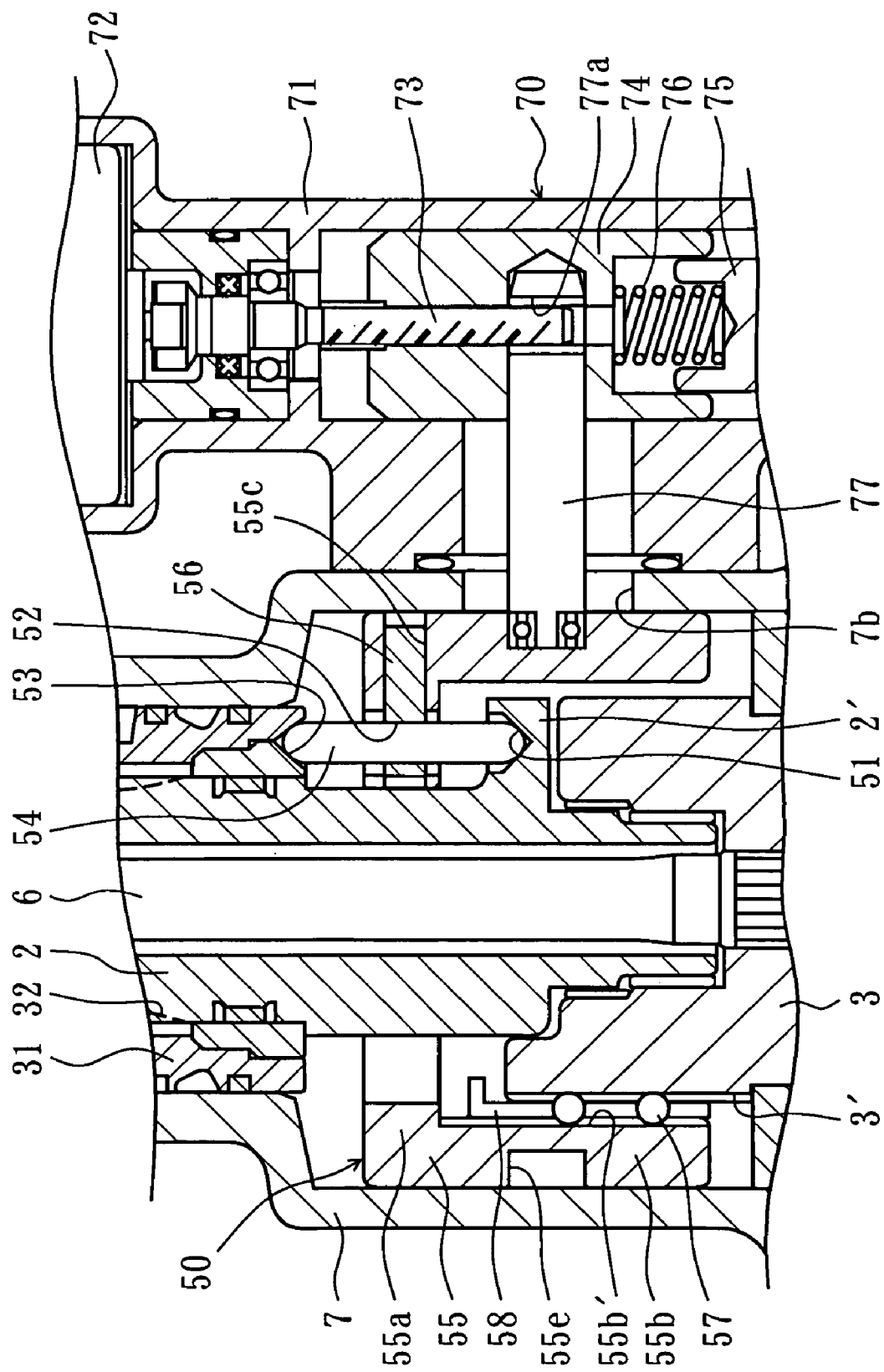
FIG. 4 is a longitudinal sectional view of an essential part in the hydraulic power steering apparatus of the first embodiment of the present invention.

As is shown in FIG. 4, the rotation conversion mechanism 50 has a first supporting part 51 which rotates together with the input shaft 2, a second supporting part 52 which rotates together with the output shaft 3, a third supporting part 53 which rotates together with the outer valve element 31, and a swinging member 54. The respective supporting parts 51, 52 and 53 are spaced from each other in the axial direction of the input and output shafts 2 and 3.

The first supporting part 51 of the present embodiment is constituted by a recessed part formed in one end of an arm 2' protruding from the outer circumference of the input shaft 2. The inner surface of this recessed part is formed along a conical surface and faces one end of the outer valve element 31. Specifically, the first supporting part 51 is formed integrally with the input shaft 2, so that relative displacement of the first supporting part 51 in the axial direction to the input and output shafts 2 and 3 is restricted.

The second supporting part 52 of the present embodiment has a moving body 55 and a receiving part 56.

The moving body 55 has an annular part 55a which is concentric with the input and output shafts 2 and 3, and a tubular part 55b which extends in the axial direction of the input and output shafts 2 and 3 from the circumferential edge of the annular part 55a. The input shaft 2 is inserted into the central hole of the annular part 55a so that relative rotation is possible, and the inner circumference of the tubular part 55b faces to the outer circumference of the input and output shafts 2 and 3. A groove 3' and a groove 55b' facing to each other are formed in the outer circumference of the output shaft 3 and the inner circumference of the tubular part 55b along the axial direction of the input and output shafts 2 and 3. A plurality of balls 57 such as steel balls or the like are inserted into the grooves 3' and 55b' so as to roll in the axial direction of the input and output shafts 2 and 3 without being displaced in the circumferential direction of the input and output shafts 2 and 3. As a result, the moving body 55 is connected with the output shaft 3 via the balls 57 so that this moving body 55 can rotate together with the output shaft 3 and relative movement of the moving body 55 in the axial direction to the input and output shafts 2 and 3 is possible. Furthermore, a retainer 58 which holds the balls 57 is provided.

The receiving part 56 has a cylindrical shape, and is inserted into a retaining hole 55c formed in the moving body 55 so as to be capable of rotating about its own axis. The axis of the receiving part 56 is perpendicular to the axis of the input and output shafts 2 and 3. As a result, the receiving part 56 is held by the moving body 55 so as to be capable of rotating about an axis perpendicular to the axis of the input and output shafts 2 and 3. As a result of the movement of the moving body 55, relative movement of the second supporting part 52 in the axial direction to the input and output shafts 2 and 3 is generated.

The third supporting part 53 of the present embodiment is constituted by a recessed part formed in one end of the outer valve element 31. The inner surface of this recessed part is formed along a conical surface and faces to one end of the arm 2' of the input shaft 2. Specifically, the third supporting part 53 is formed integrally with the outer valve element 31, so that relative displacement of the third supporting part 53 in the axial direction to the outer valve element 31 is restricted.

Figure 5:
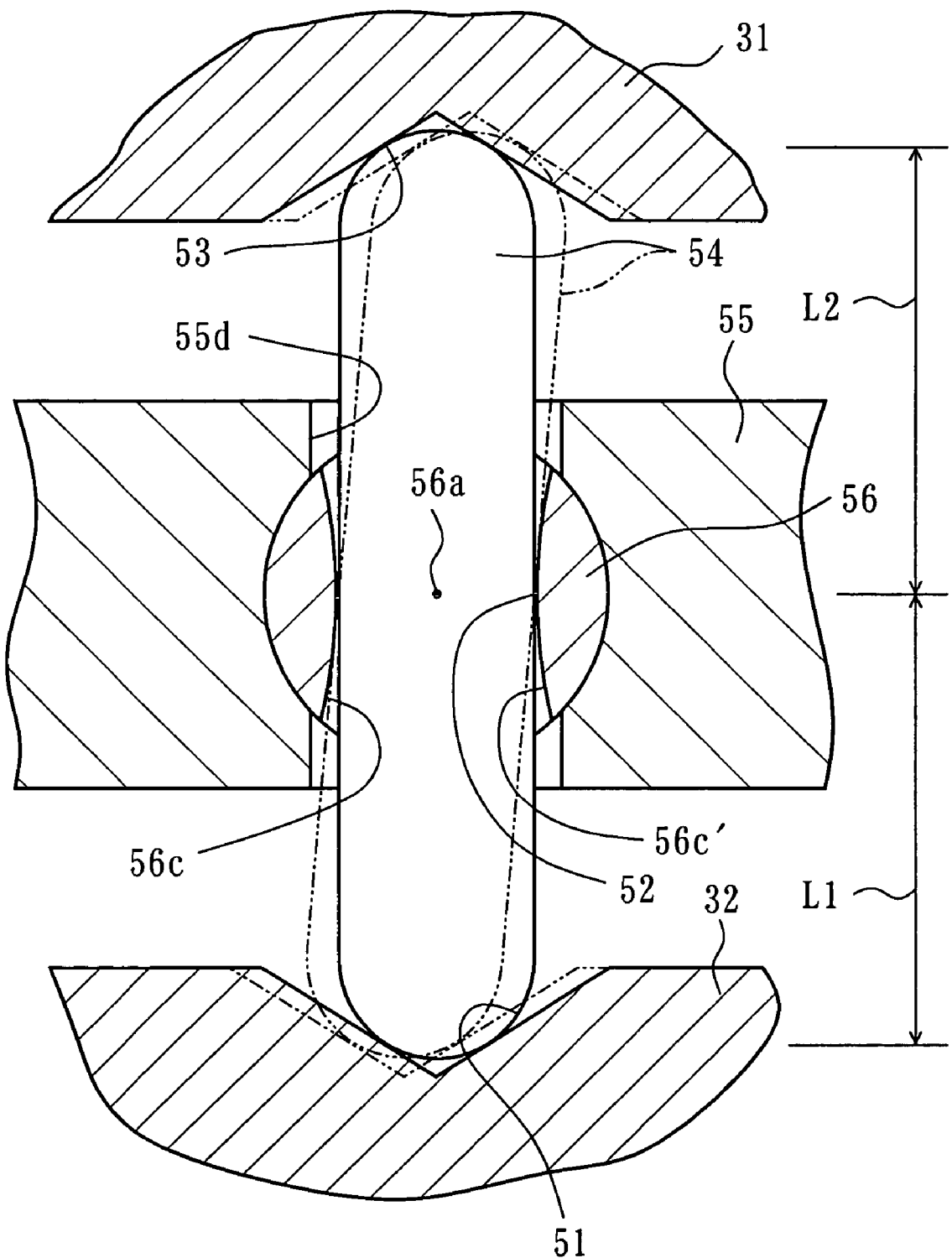
FIG. 5 is a partial enlarged longitudinal sectional view of the moving body, receiving part and swinging member in the hydraulic power steering apparatus of the first embodiment of the present invention.
Figure 6:
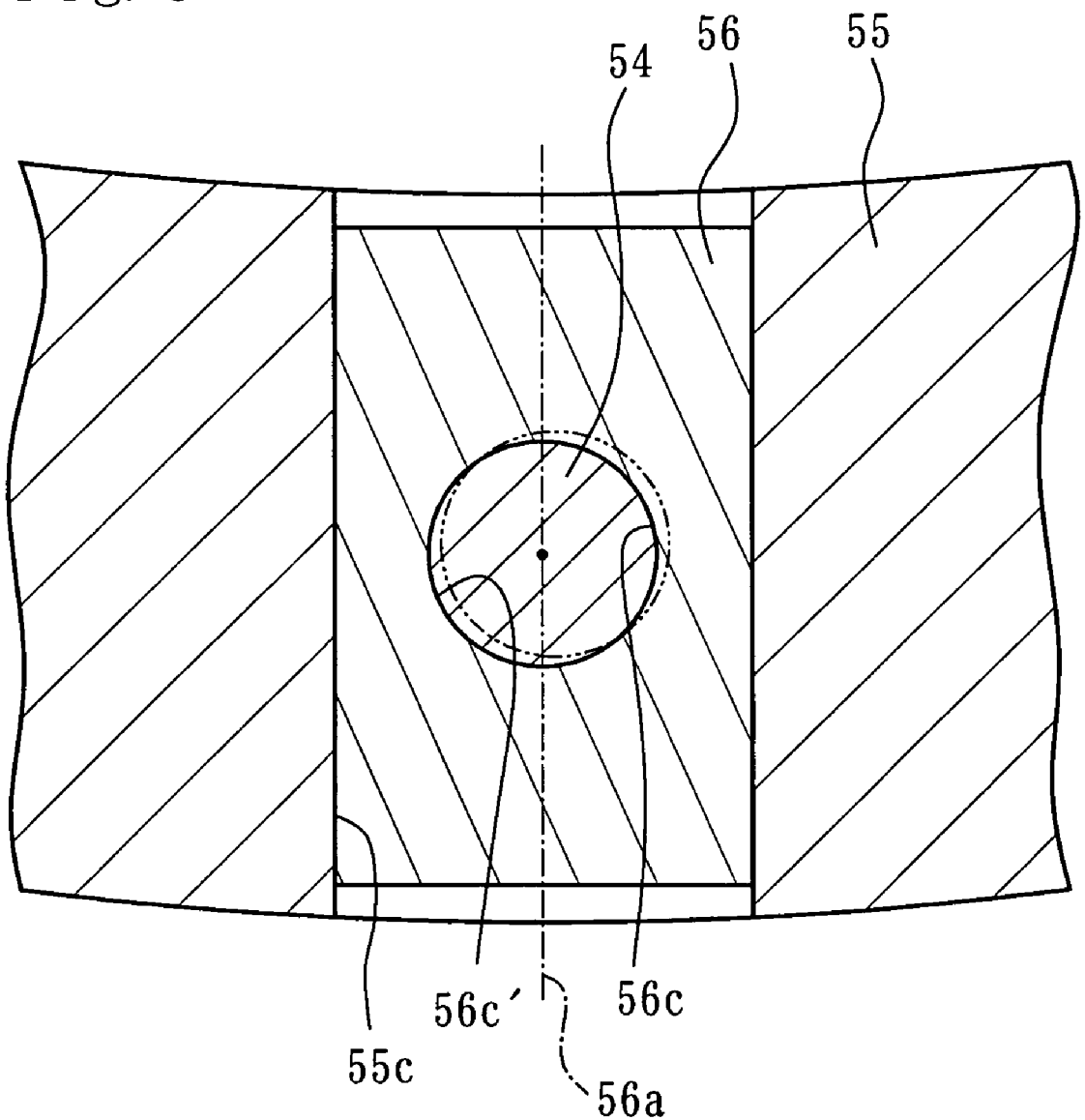
FIG. 6 is a partial enlarged cross-sectional view of the moving body, receiving part and swinging member in the hydraulic power steering apparatus of the first embodiment of the present invention.

The swinging member 54 is supported by the first supporting part 51 and the second supporting part 52 so as to swing in accordance with the relative rotation between the input and output shafts 2 and 3, and is supported by the third supporting part 53 so that relative rotation of the outer valve element 31 to the inner valve element 32 is generated as a result of this swinging movement. Specifically, the outer circumferential part of the swinging member 54 is formed as a cylindrical surface, and the respective end parts thereof are formed as spherical surfaces. One end part of the swinging member 54 is fitted in the recessed part constituting the first supporting part 51 and rotates together with the first supporting part 51 as a result of contacting with the inner surface of this recessed part. The other end part of the swinging member 54 is fitted in the recessed part constituting the third supporting part 53 and rotates together with the third supporting part 53 as a result of contacting with the inner surface of this recessed part. The outer circumferential part between both end parts of the swinging member 54 is supported by the second supporting part 52 via the receiving part 56. As shown in FIGS. 5 and 6, the swinging member 54 is passed through a through-hole 55d formed in the moving body 55 and a through-hole 56c formed in the receiving part 56 so as to be capable of moving in the axial direction. The inner circumferential surface of the through-hole 56c is formed as a curved surface 56c' which contacts with the outer circumference of the swinging member 54 so that relative swinging is possible, and the outer circumferential part between both end parts of the swinging member 54 contacts with the curved surface 56c' so as to rotate together with the second supporting part 52. For example, as a result of the relative rotation between the input and output shafts 2 and 3, the swinging member 54 indicated by the solid line in FIGS. 5 and 6 swings as indicated by the two-dot chain line. As a result of this swinging of the swinging member 54, the receiving part 56 rotates about its own axis 56a. Since the relative displacements of the first supporting part 54 and the third supporting part 53 to the swinging member 54 are restricted in the axial direction of the input and output shafts 2 and 3, the distance between the first supporting part 51 and the third supporting part 53 in the axial direction of the input and output shafts 2 and 3 tends to vary as the result of the swinging of the swinging member 54. The outer valve element 31 is fitted to the inner valve element 32 in such a manner that relative movement in the axial direction is possible, thus allowing the variation in the distance between the first supporting part 51 and the second supporting part 52 in the axial direction of the input and output shafts 2 and 3 as the result of the swinging of the swinging member 54. Therefore, relative displacement of the third supporting part 53 in the axial direction to the input and output shafts 2 and 3 is generated by an amount equal to this distance variation. Furthermore, in order to prevent looseness of the outer valve element 31 in the axial direction, as shown in FIG. 1, a compression spring 59 which applies an elastic force to press the inner surface of the recessed part constituting the third supporting part 53 against the other end part of the swinging member 54 is held by the other end part of the outer valve element 31 and a spring receiver 7a attached to the input shaft 2.

Figure 7:
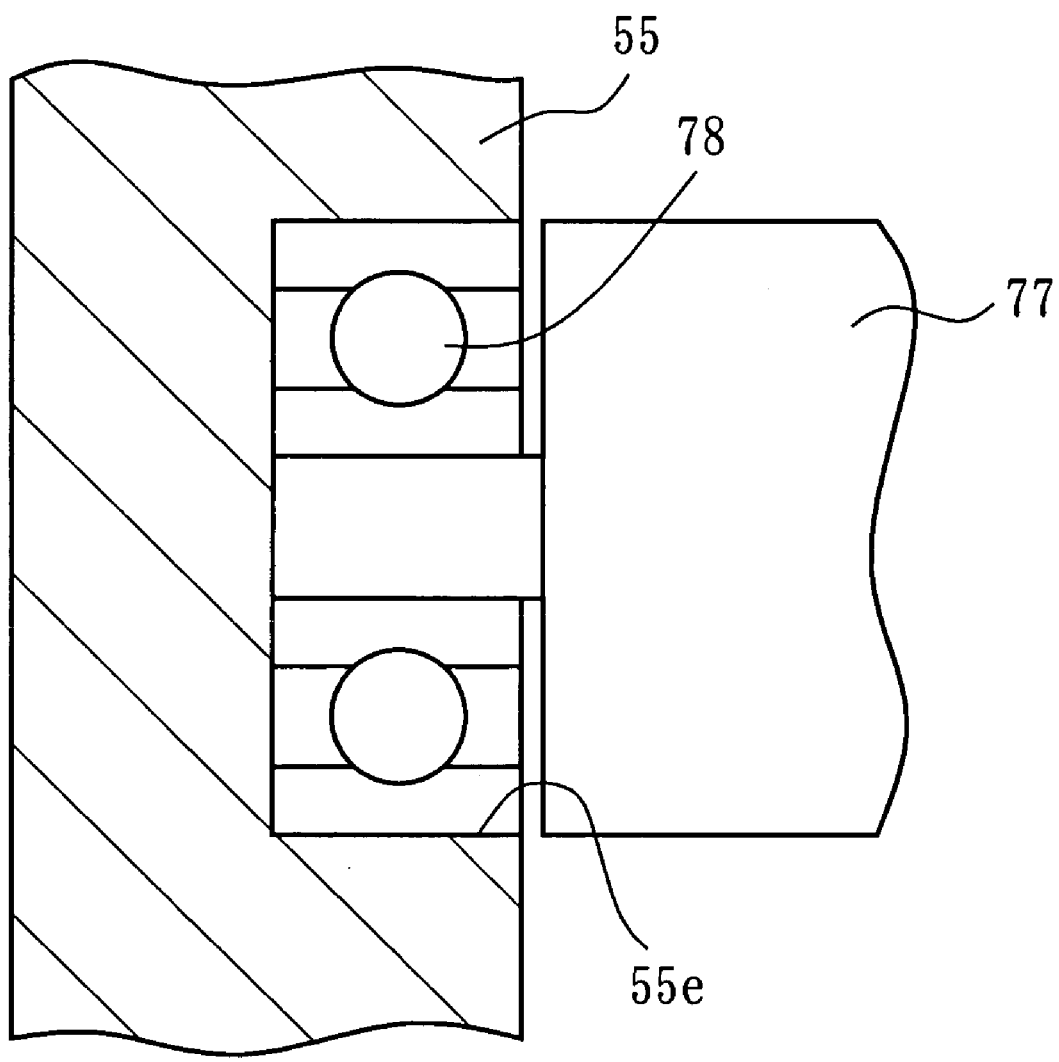
FIG. 7 is a partial enlarged sectional view of the moving body and connecting member in the hydraulic power steering apparatus of the first embodiment of the present invention.

The rotation ratio altering mechanism 70 of the present embodiment generates relative displacement of the second supporting part 52 in the axial direction to the input and output shafts 2 and 3 by a distance corresponding to the operating condition of the vehicle. In the rotation ratio altering mechanism 70 of the present embodiment, as is shown in FIG. 4, a screw shaft 73 which has an axis parallel to the axis of the input and output shafts 2 and 3 is attached to the rotating shaft of a stepping motor 72 held by a casing 71 attached to the housing 7, and a travelling member 74 which is screwed to the screw shaft 73 is fitted in the casing 71 so as to be movable parallel to the axial direction of the input and output shafts 2 and 3. Furthermore, a plug 75 is screwed to the casing 71, and a compression spring 76 is held by the plug 75 and the travelling member 74 so that elastic force is applied along the axial direction of the screw shaft 73. Therefore, the travelling member 74 is constantly pressed against one side of the thread of the screw shaft 73, so that positional deviation of the travelling member 74 is eliminated. The travelling member 74 and the moving body 55 are connected by a connecting member 77 so as to be movable together in the axial direction of the input and output shafts 2 and 3. The connecting member 77 passes through a through-hole 7b formed in the housing 7 and has a cylindrical shape whose axis is perpendicular to the axis of the input and output shafts 2 and 3. One end of the connecting member 77 is fastened to the travelling member 74 by press fitting or the like and has a hole 77a through which the screw shaft 73 is passed. Furthermore, the through-hole 7b has a shape of a slot whose long diameter is oriented in the axial direction of the screw shaft 73, and the travelling member 74 is inserted into this through-hole 7b so as to be movable in the axial direction of the screw shaft 73 and so as not to rotate about its own axis; therefore the travelling member 74 is prevented from rotating together with the screw shaft 73. A circumferential groove 55e concentric with the input and output shafts 2 and 3 is formed in the outer circumference of the moving body 55. As is shown in FIG. 7, the other end of the connecting member 77 is inserted into the circumferential groove 55e via a rolling bearing 78 which has an axis perpendicular to the axis of the input and output shafts 2 and 3. As shown in FIG. 1, the stepping motor 72 is connected to a control device 80, and this control device 80 is connected to a sensor 81 which detects the vehicle speed as the operating condition in the present embodiment. The rotation angle of the rotating shaft of the stepping motor 72 is varied by the control device 80 in accordance with the vehicle speed. As a result, relative movement of the travelling member 74 in the axial direction to the screw shaft 73 is generated in accordance with the vehicle speed, and the second supporting part 52 is displaced together with the travelling member 74. In the present embodiment, the second supporting part 52 is displaced upward in FIG. 1 as the vehicle speed increases.

In the abovementioned embodiment, as a result of the relative rotation between the input and output shafts 2 and 3, relative displacement of the second supporting part 52 which rotates together with the output shaft 3 to the first supporting part 51 which rotates together with the input shaft 2 is generated in the circumferential direction, and the swinging member supported by the first supporting part 51 and the second supporting part 52 swings. As a result of the swinging of this swinging member 54, relative rotation of the outer valve element 31 which rotates together with the third supporting part 53 supporting the swinging member 54 to the inner valve element 32 which rotates together with the input shaft 2 is generated. As a result of the relative displacement of the second supporting part 52 in the axial direction to the input and output shafts 2 and 3 by a distance corresponding to the vehicle speed, the mutual distances between the respective supporting parts 51, 52 and 53 vary. The amount of swinging of the swinging member 54 on the third supporting part 53 varies in accordance with the variation in the distances between the respective supporting parts 51, 52 and 53. As shown in FIG. 5 for example, the distance between the first supporting part 51 and second supporting part 52 is designated as L1, and the distance between the second supporting part 52 and third supporting part 53 is designated as L2. When relative rotation between the input and output shafts 2 and 3 is generated, relative rotation of the inner valve element 32 integrated with the input shaft 2 to the output shaft 3 is generated in the same direction by the same angle as the input shaft 2. Meanwhile, since the relative rotation between the input and output shafts 2 and 3 is transmitted to the outer valve element 31 via the swinging member 54, relative rotation of the outer valve element 31 to the output shaft 3 is generated in the opposite direction from the input shaft 2 by an angle corresponding to the ratio of L2/L1. If L2/L1=1, then the relative rotation angle between the two valve elements 31 and 32 is twice that seen when the outer valve element 31 rotates together with the output shaft 3. Since L2/L1 varies as a result of the movement of the second supporting part 52 in the axial direction in accordance with the vehicle speed, the relative rotation angle between the two valve elements 31 and 32 varies, so that appropriate degree of steering torque corresponding to the vehicle speed can be obtained. Specifically, L2/L1 is set at a large value at low vehicle speeds so that the operating characteristics are improved, and L2/L1 is reduced at high vehicle speeds so that the stability is improved. Furthermore, the relative rotation angle between the two valve elements 31 and 32 can be increased without increasing the relative rotation angle between the input and output shafts 2 and 3 in comparison with a case where the outer valve element 31 rotates together with the output shaft 3, and therefore the rigidity of the torsion bar 6 can be increased so that the stability of straight forward motion of the vehicle is improved. In this case, since there is no need to cause relative coaxial rotation between the outer valve element 31, inner valve element 32 and input shaft 2, the inner valve element 32 can be formed as an integral part of the input shaft 2, and therefore it is sufficient to cause relative rotation of the outer valve element 31 to the integrated input shaft 2 and inner valve element 32. As a result, there is no increase in the number of parts, and also there is no requirement of a high degree of concentric machining precision in comparison with the conventional examples in which relative coaxial rotation between the three parts is required.

Furthermore, in the abovementioned embodiment, even if the distance between the first supporting part 51 and the third supporting part 53 in the axial direction of the input and output shafts 2 and 3 varies as a result of the swinging of the swinging member 54, this variation is absorbed by the relative displacement of the outer valve element 31 in the axial direction to the inner valve element 32. Accordingly, the swinging member 54 can be swung smoothly without causing any rubbing at the respective supporting parts 51, 52 and 53. Furthermore, in the second supporting part 52, since the receiving part 56 rotates about an axis perpendicular to the axis of the input and output shafts 2 and 3 due to the swinging of the swinging member 54, the swinging member 54 can be accommodated to the displacement of the center of swinging so as to swing in a smooth manner. Furthermore, the friction between the connecting member 77 and the circumferential groove 55*e* can be reduced by inserting the connecting member 77 into the circumferential groove 55*e* of the moving body 55 of the second supporting part 52 via the rolling bearing 78, so that the input and output shafts 2 and 3 can rotate in a smooth manner. Furthermore, the play between the connecting member 77 and the circumferential groove 55*e* can be reduced, so that the generation of a large percussive noise can be prevented when the moving body 55 is moved in the axial direction of the input and output shafts 2 and 3. Furthermore, since the relative movement of the moving body 55 of the second supporting part 52 in the axial direction to the output shaft 3 is performed via balls 57 inserted into the groove 3' and groove 55*b'*, the moving body 55 can be moved smoothly in the axial direction of the input and output shafts 2 and 3 when the ratio of the relative rotation angle between the two valve elements 31 and 32 to the relative rotation angle between the input and output shafts 2 and 3 is varied.

Furthermore, the second supporting part 52 is disposed between the first supporting part 51 and third supporting part 53 in the axial direction of the input and output shafts 2 and 3, and the first supporting part 51 which rotates together with the input shaft 2 serves as the force point of the swinging member 54, the second supporting part 52 which rotates together with the output shaft 3 serves as the fulcrum of the swinging member 54, and the third supporting part 53 which rotates together with the outer valve element 31 serves as the action point of the swinging member 54. As a result, since the fulcrum of the swinging member 54 is disposed between the force point and the action point in the axial direction of the input and output shafts 2 and 3, the swinging member 54 is supported in good balance, and the relative displacement of the action point to the fulcrum is small in comparison with a case where the fulcrum is disposed at one end of the swinging member 54. Accordingly, rubbing at the respective supporting parts 51, 52 and 53 of the swinging member 54 and between the two valve elements 31 and 32 can be prevented, so that smooth relative rotation between the two valve elements 31 and 32 can be accomplished, thus making it possible to achieve a quick steering assist, and to improve the feeling of steering.

Figure 8:
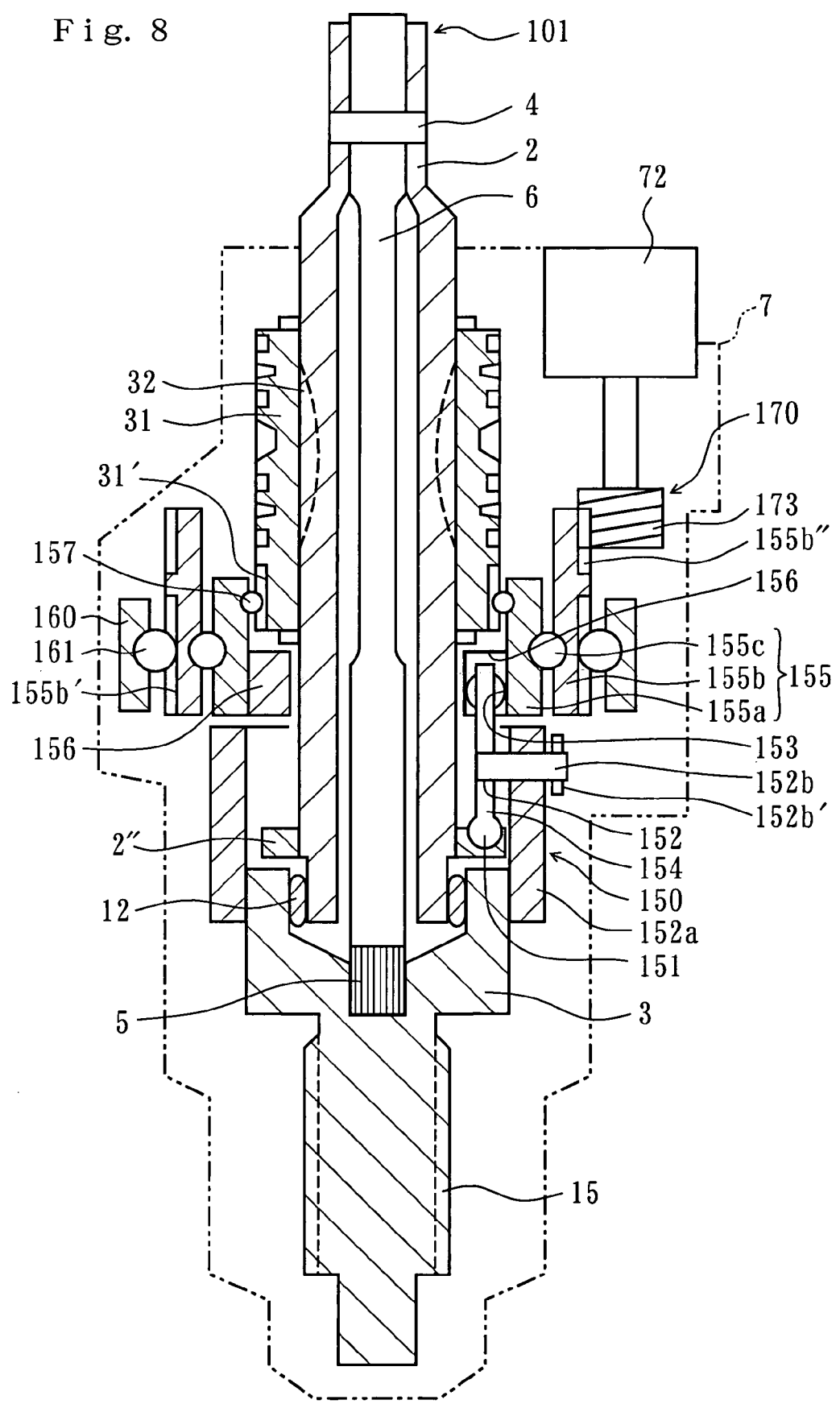
FIG. 8 is a longitudinal sectional view of a hydraulic power steering apparatus constituting a second embodiment of the present invention.
Figure 9:
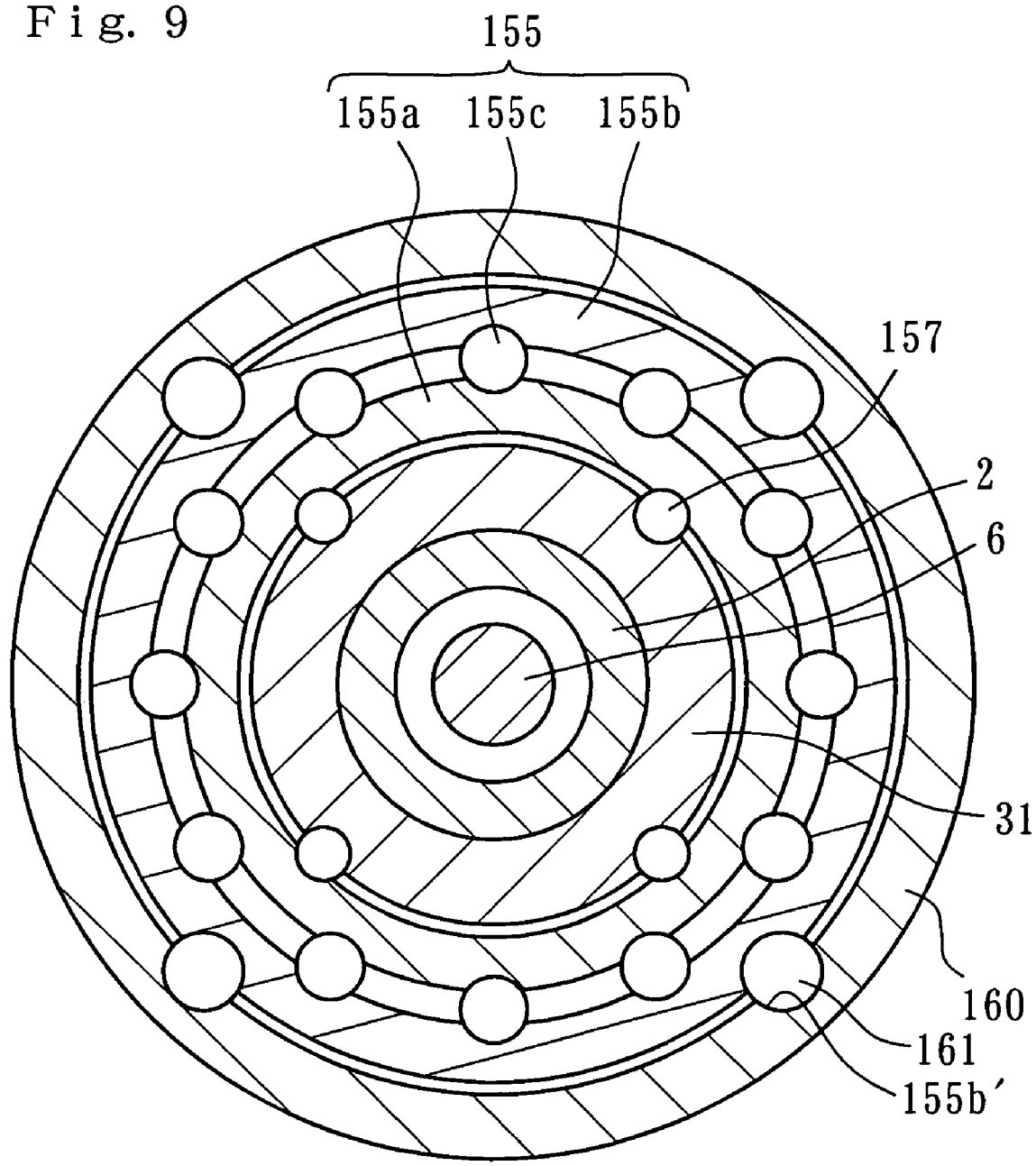
FIG. 9 is a cross-sectional view of an essential part in the hydraulic power steering apparatus of the second embodiment of the present invention.
Figure 10:
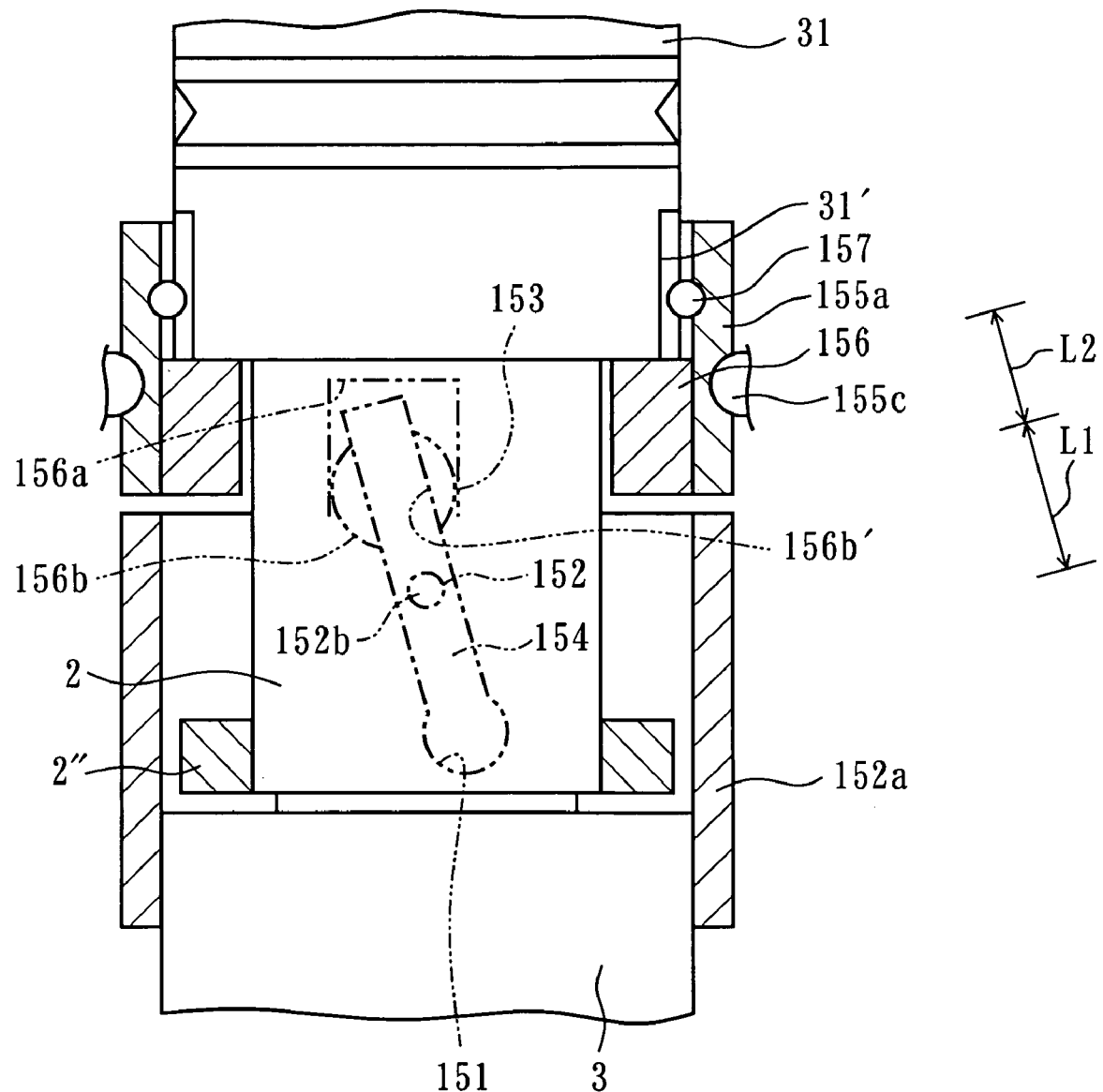
FIG. 10 is a longitudinal sectional view of an essential part in the hydraulic power steering apparatus of the second embodiment of the present invention.

The rack and pinion type hydraulic power steering apparatus constituting a second embodiment of the present invention shown in FIGS. 8 through 10 comprises a rotation conversion mechanism 150 and a rotation ratio altering mechanism 170 which differ from those of the first embodiment. Below, parts which are the same as in the first embodiment are indicated by the same reference numerals, and only the points of difference are described.

The first supporting part 151 in the rotation conversion mechanism 150 is constituted by a recessed part which is formed in one end of an annular member 2" integrated with the outer circumference of the input shaft 2, and the inner surface of this recessed part is formed along a spherical surface.

The second supporting part 152 of the second embodiment has a tubular member 152*a* which is fitted to the output shaft 3 so that relative displacement in the axial direction to the input and output shafts 2 and 3 is restricted and rotation together with the output shaft 3 is allowed, and has a supporting shaft 152*b* attached to the tubular member 152*a*. The supporting shaft 152*b* is attached to the tubular member 152*a* so as to rotate about its own axis perpendicular to the axis of the input and output shafts 2 and 3, and is prevented from detaching by a pin 152*b'*.

The third supporting part 153 of the second embodiment has a moving body 155, a receiving part 156 and a retaining part 160.

The moving body 155 is constructed by fitting an inner race part 155*a* in an outer race part 155*b* via a plurality of rolling bodies 155*c* such as balls or the like so that relative concentric rotation to the input and output shafts 2 and 3 is possible, and the outer valve element 31 is inserted into the inner race part 155*a*. A plurality of grooves 31' are formed in the outer circumference of the outer valve element 31 along the axial direction of the input and output shafts 2 and 3 with spaces in the circumferential direction. Balls 157 such as steel balls or the like which are inserted into the respective grooves 31' so as to be capable of rolling are held by the inner race part 155*a* so as to be capable of rolling.

The receiving part 156 is constituted by an annular member integrated with the inner race part 155*a* at a position facing one end of the outer valve element 31. The receiving part 156 has a recessed part 156*a* and a receiving member 156*b* disposed inside the recessed part 156*a*. A portion of the outer circumference of the receiving member 156*b* is formed as a spherical surface which contacts the inner surface of the recessed part 156*a* so that relative rotation is possible. The swinging member 154 is inserted into a retaining hole 156*b'* formed through the receiving member 156*b* with a slight gap.

The retaining part 160 has a ring shape which is concentric with the input and output shafts 2 and 3, and is fastened to the housing 7. A plurality of grooves 155*b'* are formed in the outer circumference of the outer race part 155*b* along the axial direction of the input and output shafts 2 and 3 with spaces in the circumferential direction. Balls 161 such as steel balls or the like inserted into the respective grooves 155*b'* so as to be capable of rolling are held by the retaining part 160 so as to be capable of rolling.

As a result, the third supporting part 153 can rotate together with the outer valve element 31 and is capable of relative movement to the input and output shafts 2 and 3 in the axial direction.

The swinging member 154 of the second embodiment has an outer circumferential part which is formed as a cylindrical surface, one end part which is formed as a spherical surface, and the other end part which is formed as a flat surface. The one end part of the swinging member 154 is fitted in the recessed part which constitutes the first supporting part 151 and contacts the inner surface of this recessed part so as to rotate together with the first supporting part 151. The other end part of the swinging member 154 is inserted into a retaining hole 156*b'* passing through the receiving member 156*b* which constitutes the third supporting part 153, and the outer circumferential spherical surface of the receiving member 156*b* contacts the inner surface of the recessed part 156*a* so that the other end of the swinging member 154 rotates together with the third supporting part 153. The area between both end parts of the swinging member 154 is integrated with the supporting shaft 152b of the second supporting part 152. A slight gap is formed between the outer circumference of the swinging member 154 and the retaining hole 156b', and the supporting shaft 152b is rotatably supported by the tubular member 152a via a slight gap so that the swinging member 154 swings smoothly by the relative rotation between the input and output shafts 2 and 3.

In the rotation ratio altering mechanism 170 of the second embodiment, a screw gear 173 is fitted to the rotating shaft of the stepping motor 72 attached to the housing 7, and a screw gear 155b'' which engages with this screw gear 173 is formed on the outer circumference of the outer race part 155b of the moving body 155. When the rotation angle of the rotating shaft of the stepping motor 72 varies in accordance with the vehicle speed, relative movement of the moving body 155 of the third supporting part 153 in the axial direction to the input and output shafts 2 and 3 is generated in accordance with the vehicle speed. In the present embodiment, the third supporting part 153 moves downward in FIG. 8 as the vehicle speed increases. The remainder of this embodiment has the same construction as in the first embodiment.

In the abovementioned second embodiment, as a result of the relative rotation between the input and output shafts 2 and 3, relative displacement of the second supporting part 152 which rotates together with the output shaft 3 to the first supporting part 151 which rotates together with the input shaft 2 is generated in the circumferential direction, so that the swinging member 154 supported by the first supporting part 151 and second supporting part 152 swings. As a result of this swinging of the swinging member 154, relative rotation of the outer valve element 31 which rotates together with the third supporting part 153 supporting the swinging member 154 to the inner valve element 32 which rotates together with the input shaft 2 is generated. When relative displacement of the third supporting part 153 in the axial direction to the input and output shafts 2 and 3 is generated by a distance corresponding to the vehicle speed, the mutual distances between the respective supporting parts 151, 152 and 153 vary. The amount of swinging of the swinging member 154 on the third supporting part 153 varies in accordance with change in the distance between the respective supporting parts 151, 152, and 153. For example, in FIG. 10, if the distance between the first supporting part 151 and second supporting part 152 in the axial direction of the input and output shafts 2 and 3 is designated as L1, and the distance between the second supporting part 152 and third supporting part 153 is designated as L2, then the amount of swinging of the swinging member 154 on the third supporting part 153 is proportional to L2/L1, and the distances L1 and L2 vary according to the displacement of the third supporting part 153 in the axial direction. Since the amount of swinging of the swinging member 154 on the third supporting part 153 corresponds to the relative rotation angle between the two valve elements 31 and 32, the ratio of the relative rotation angle between the two valve elements 31 and 32 to the relative rotation angle between the input and output shafts 2 and 3 varies in accordance with the vehicle speed. Consequently, as in the first embodiment, the stability of straight forward motion at high vehicle speeds can be improved by using a torsion bar 6 with large rigidity, and the steering performance can be improved by increasing the value of L2/L1 at low vehicle speeds so that the steering assist force is increased. In this case, since there is no need to cause relative coaxial rotation between the outer valve element 31, inner valve element 32 and input shaft 2, the inner valve element 32 can be formed as an integral unit with the input shaft 2, and therefore it is sufficient to cause relative rotation of the outer valve element 31 to the integrated input shaft 2 and inner valve element 32. As a result, there is no need for a high degree of concentric machining precision in comparison with the conventional example in which relative coaxial rotation between the three parts is required. Furthermore, since the moving body 155 of the third supporting part 153 is connected to the outer valve element 31 via the grooves 31' and balls 157 so that relative movement in the axial direction of the input and output shafts 2 and 3 is possible, the moving body 155 can be moved smoothly in the axial direction of the input and output shafts 2 and 3 when the ratio of the relative rotation angle between the two valve elements 31 and 32 to the relative rotation angle between the input and output shafts 2 and 3 is varied. Moreover, since the second supporting part 152 is disposed between the first supporting part 151 and the third supporting part 153 in the axial direction of the input and output shafts 2 and 3, the swinging member 154 is supported in good balance as in the first embodiment, and rubbing at the respective supporting parts 151, 152 and 153 of the swinging member 154 and between the two valve elements 31 and 32 can be prevented, so that smooth relative rotation between the two valve elements 31 and 32 can be achieved, thus making it possible to accomplish a quick steering assist and to improve the feeling of steering.

Figure 11:
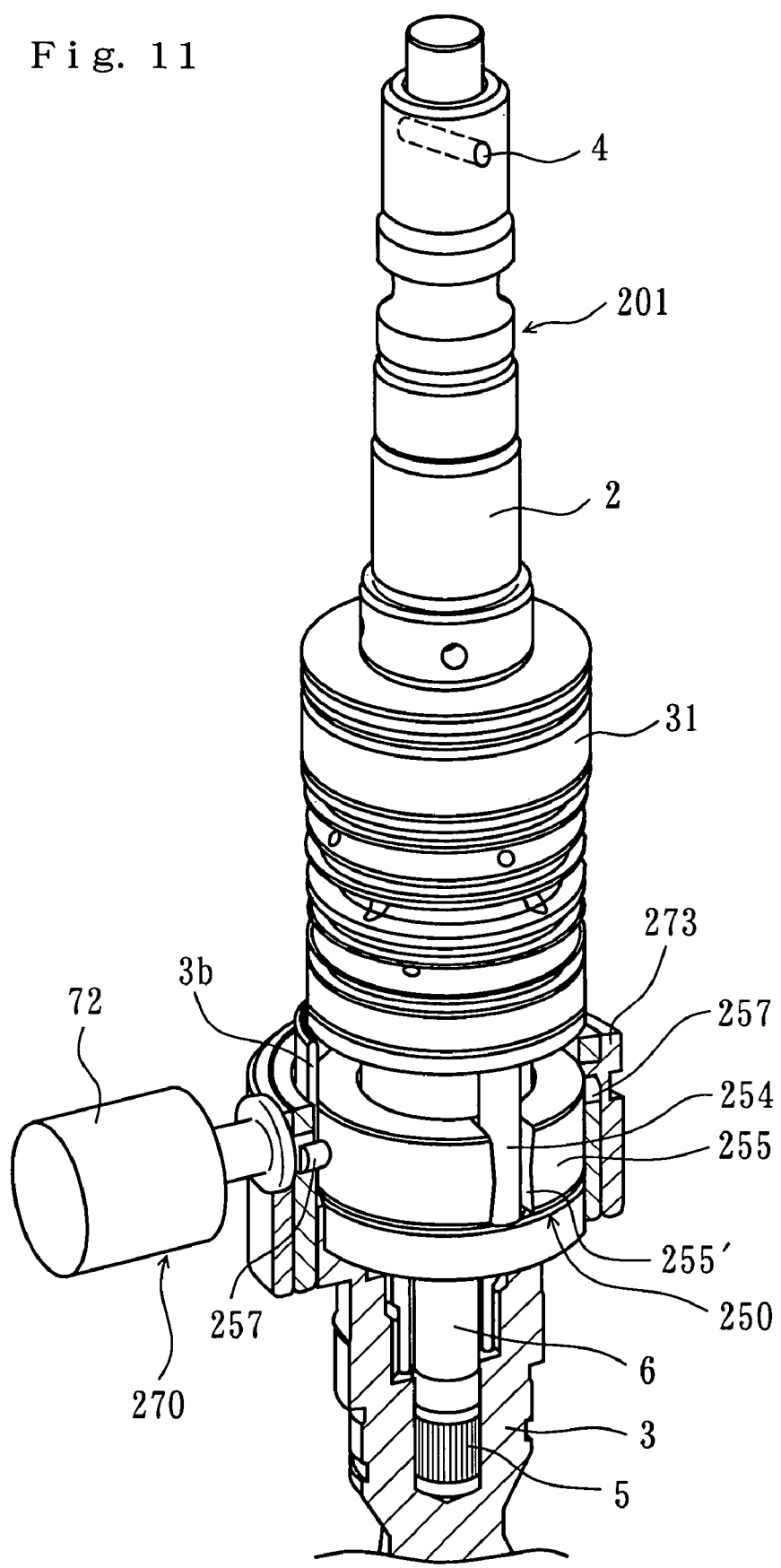
FIG. 11 is a perspective view of an essential part in a hydraulic power steering apparatus constituting a third embodiment of the present invention.
Figure 12:
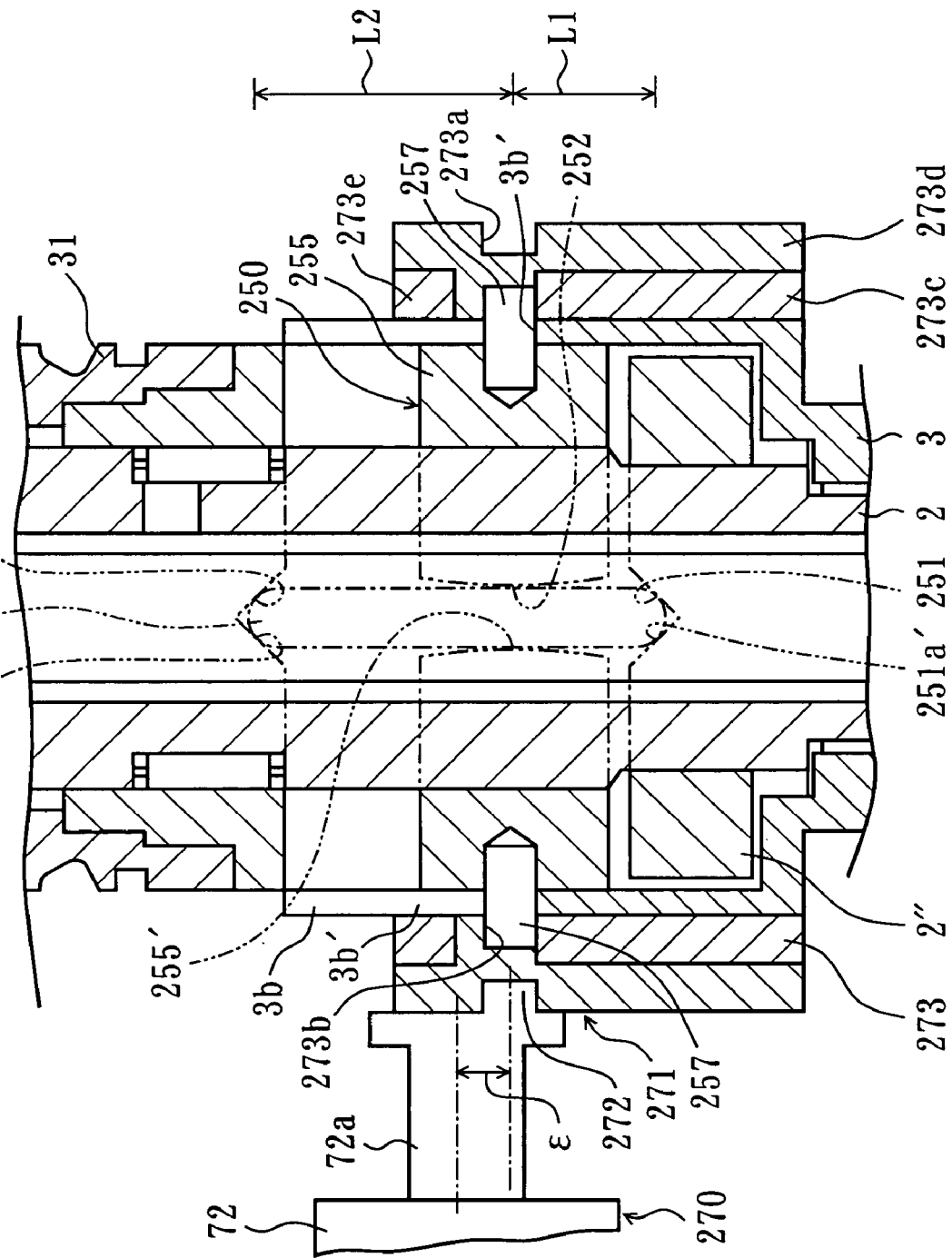
FIG. 12 is a longitudinal sectional view of an essential part in the hydraulic power steering apparatus of the third embodiment of the present invention.

The rack and pinion type hydraulic power steering apparatus 201 of the third embodiment of the present invention shown in FIGS. 11 and 12 comprises a rotation conversion mechanism 250 and a rotation ratio altering mechanism 270 which differ from those of the first embodiment. Below, parts which are the same as in the first embodiment are indicated by the same reference numerals, and only the points of difference are described.

The first supporting part 251 in the rotation conversion mechanism 250 is constituted by a recessed part 251a' formed in one end of an annular member 2'' which is integrated with the outer circumference of the input shaft 2 by press fitting or the like, and the inner surface of this recessed part 251a' contacts one end part of the swinging member 254.

The second supporting part 252 of the third embodiment has a moving body 255. The moving body 255 has an annular shape concentric with the input and output shafts 2 and 3, and the input shaft 2 is inserted into the central hole of this moving body 255 so that relative rotation and relative movement in the axial direction are possible. The moving body 255 has a split part, and the end surfaces facing to each other in this split part are formed as curved surfaces 255' which contact the outer circumferential surface of the swinging member 254 so that relative swinging motion is possible, for example, these surfaces 255' are formed along a catenoid. The output shaft 3 has a cylindrical circumferential wall 3b which extends in the axial direction from the outer circumference at one end thereof, and a plurality of connecting grooves 3b' are formed in this circumferential wall 3b. The moving body 255 is guided by the outer circumference of the input shaft 2 and the inner circumference of the circumferential wall 3b, so that relative movement of the moving body 255 in the axial direction to the input and output shafts 2 and 3 is possible. Each connecting groove 3b' has a slot-form shape in which the direction of the long diameter is oriented along the input and output shafts 2 and 3. Connecting pins 257 which are inserted in the respective connecting grooves 3b' are fastened to the moving body 255 by press fitting or the like. The axis of the connecting pins 257 are perpendicular to the axis of the input and output shafts 2 and 3, and these pins 257 are inserted in the connecting grooves 3b' so that movement in the axial direction of the input and output shafts 2 and 3 and movement in the circumferential direction together with the input and output shafts 2 and 3 are possible. As a result, the moving body 255 is connected to the output shaft 3 via the connecting pins 257 so that the moving body 255 rotates together with the output shaft 3 and relative movement of the moving body 255 to the output shaft 3 in the axial direction of the input and output shafts 2 and 3 is possible.

The third supporting part 253 of the third embodiment is constituted by a recessed part 253a' which is formed in one end of the outer valve element 31, and the inner surface of this recessed part 253a' contacts the other end part of the swinging member 254 so that relative swinging motion is possible.

The outer circumferential part of the swinging member 254 of the third embodiment is formed as a cylindrical surface, and both end parts of the swinging member 254 are formed as spherical surfaces. One end part of the swinging member 254 is fitted in the recessed part which constitutes the first supporting part 251, and rotates together with the first supporting part 251 by contacting with the inner surface of this recessed part. The other end part of the swinging member 254 is inserted into the recessed part which constitutes the third supporting part 253, and rotates together with the third supporting part 253 by contacting with the inner surface of this recessed part. The area between the two end parts of the swinging member 254 is inserted between the curved surfaces 255' which constitute the mutually facing end surfaces of the split part of the moving body 255, and the outer circumference of the swinging member 254 contacts with these two curved surfaces 255' so as to rotate together with the second supporting part 252. A slight gap is formed between the outer circumference of the swinging member 254 and the two curved surfaces 255' of the second supporting part 252 so that the swinging member 254 swings smoothly as a result of the relative rotation between the input and output shafts 2 and 3.

In the rotation ratio altering mechanism 270 of the third embodiment, the rotating shaft 72a of the stepping motor 72 attached to the housing 7 is connected to the moving body 255 via a crank mechanism 271. The crank mechanism 271 has an eccentric shaft 272 integrated with the rotating shaft 72a, and a cylindrical travelling member 273. The axis of the eccentric shaft 272 has an eccentricity of ε in FIG. 12 to the axis of the rotating shaft 72a. The travelling member 273 is fitted to the outer circumference of the circumferential wall 3b so that relative coaxial rotation and relative movement to the circumferential wall 3b in the axial direction of the input and output shafts 2 and 3 are possible. The eccentric shaft 272 is inserted into a first circumferential groove 273a formed in the outer circumference of the travelling member 273 so that relative movement in the circumferential direction to the travelling member 273 is possible, and the connecting pins 257 are inserted into a second circumferential groove 273b formed in the inner circumference of the travelling member 273 so that relative movement in the circumferential direction to the travelling member 273 and movement together with the travelling member in the axial direction are possible. As a result, when the rotation angle of the rotating shaft 72a of the stepping motor 72 varies in accordance with the vehicle speed, the moving body 255 of the second supporting part 252 and the travelling member 273 moves relatively to the input and output shafts 2 and 3 in the axial direction in accordance with the vehicle speed. In the present embodiment, the second supporting part 252 moves upward in FIG. 12 as the vehicle speed increases. Furthermore, in order to facilitate assembly, the travelling member 273 is constructed from three annular parts 273a, 273b and 273c. The remaining construction is the same as in the first embodiment.

In the abovementioned third embodiment, as a result of the relative rotation between the input and output shafts 2 and 3, relative displacement of the second supporting part 252 which rotates together with the output shaft 3 is generated in the circumferential direction to the first supporting part 251 which rotates together with the input shaft 2, and the swinging member 254 supported by the first supporting part 251 and second supporting part 252 swings. As a result of this swinging of the swinging member 254, the outer valve element 31 which rotates together with the third supporting part 253 supporting the swinging member 254 is rotated relatively to the inner valve element 32 which rotates together with the input shaft 2. As a result of relative displacement of the second supporting part 252 in the axial direction to the input and output shafts 2 and 3 by a distance corresponding to the vehicle speed, the mutual distances between the respective supporting parts 251, 252 and 253 vary. The amount of swinging of the swinging member 254 on the third supporting part 253 varies in accordance with the variation in the mutual distances between the respective supporting parts 251, 252 and 253. For example, as shown in FIG. 12, if the distance between the first supporting part 251 and second supporting part 252 is designated as L1, and the distance between the second supporting part 252 and third supporting part 253 is designated as L2, then the amount of swinging of the swinging member 254 on the third supporting part 253 is proportional to the value of L2/L1, and the distances L1 and L2 vary in accordance with the displacement of the second supporting part 252 in the axial direction. Since the amount of swinging of the swinging member 254 on the third supporting part 253 corresponds to the relative rotation angle between the two valve elements 31 and 32, the ratio of the relative rotation angle between the two valve elements 31 and 32 to the relative rotation angle between the input and output shafts 2 and 3 varies in accordance with the vehicle speed. Consequently, as in the first embodiment, the stability of straight forward motion at high vehicle speeds can be improved by using a torsion bar 6 with large rigidity, and the steering performance can be improved by increasing the value of L2/L1 at low vehicle speeds so that the steering assist force is increased. In this case, since there is no need to cause relative coaxial rotation between the outer valve element 31, inner valve element 32 and input shaft 2, the inner valve element 32 can be formed as an integral unit with the input shaft 2, and therefore it is sufficient to cause relative rotation of the outer valve element 31 to the integrated input shaft 2 and inner valve element 32. As a result, there is no increase in the number of parts, and there is no need for a high degree of concentric machining precision in comparison with the conventional example in which relative coaxial rotation between the three parts are required. Furthermore, since the second supporting part 252 is disposed between the first supporting part 251 and third supporting part 253 in the axial direction of the input and output shafts 2 and 3, the swinging member 254 is supported in good balance as in the first embodiment, and rubbing at the respective supporting parts 251, 252 and 253 of the swinging member 254 and between the two valve elements 31 and 32 can be prevented, so that smooth relative rotation between the two valve elements 31 and 32 can be achieved, thus making it possible to accomplish a quick steering assist and to improve the feeling of steering.

Figure 13:
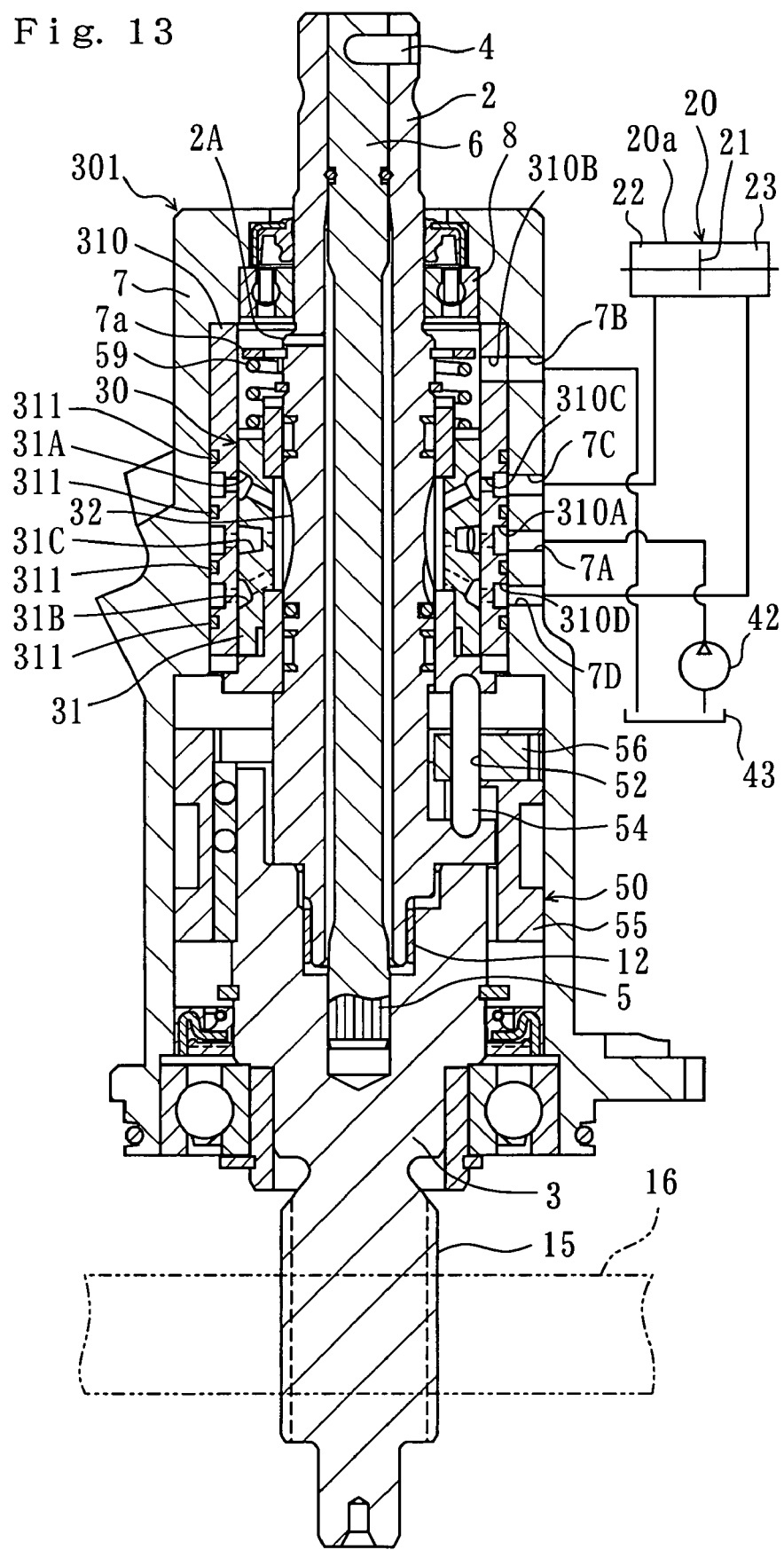
FIG. 13 is a longitudinal sectional view of an essential part in the hydraulic power steering apparatus of the fourth embodiment of the present invention.
Figure 14:
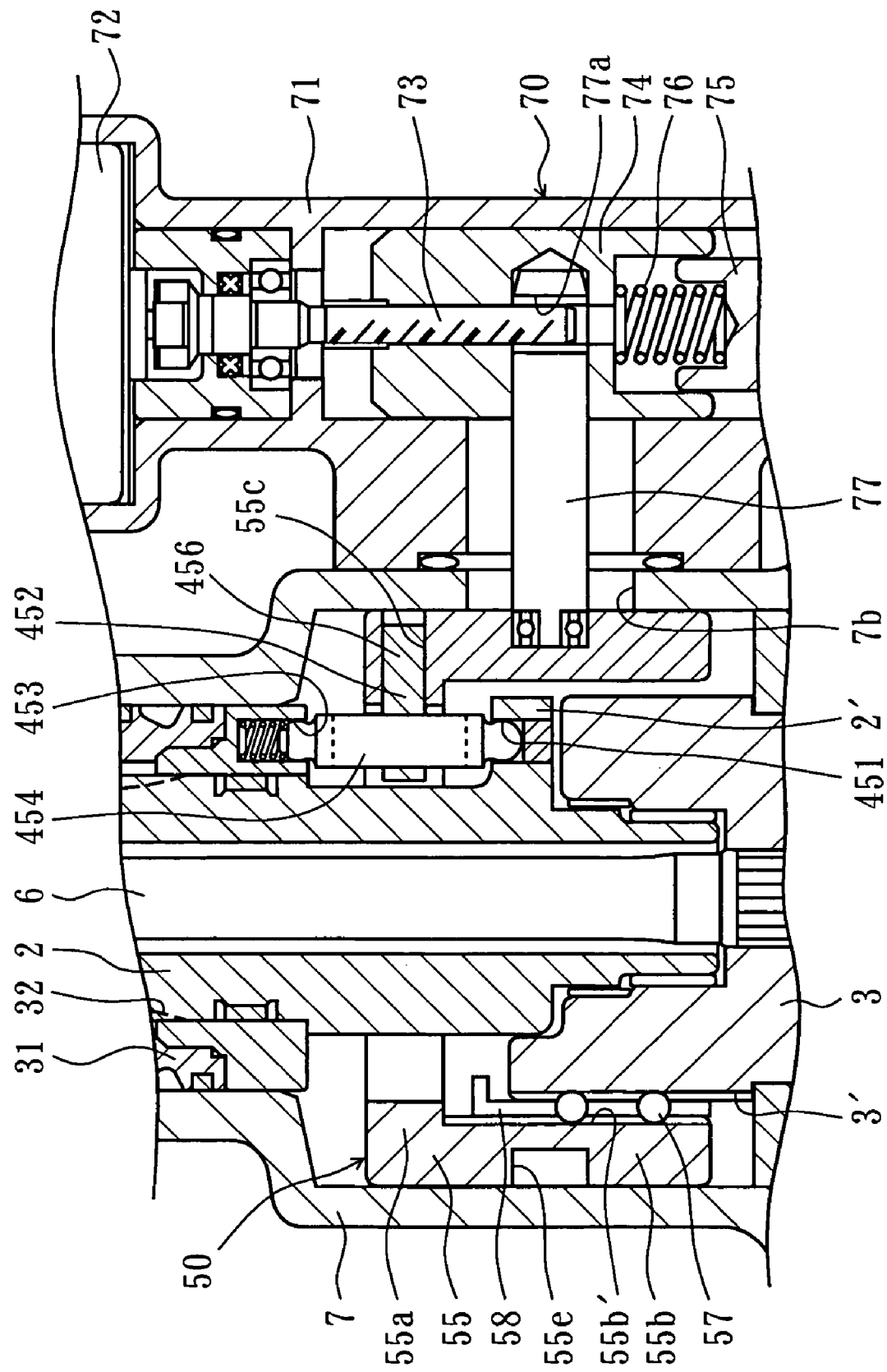
FIG. 14 is a longitudinal sectional view of an essential part in a hydraulic power steering apparatus constituting a fifth embodiment of the present invention.

FIG. 13 shows a rack and pinion type hydraulic power steering apparatus 301 constituting a fourth embodiment of the present invention. Below, parts which are the same as in the first embodiment are indicated by the same reference numerals, and only the points of difference are described. Furthermore, the indication of the rotation ratio altering mechanism 70 is omitted in FIG. 13.

The hydraulic power steering apparatus 301 of the fourth embodiment comprises a cylindrical sealing body 310 which is inserted into the housing 7. The outer valve element 31 is inserted into the sealing body 310 so that relative coaxial rotation is possible.

Hydraulic fluid flow passages for supplying hydraulic fluid to the hydraulic cylinder 20 are formed in the housing 7, sealing body 310 and outer valve element 31. The hydraulic fluid flow passages are formed in the housing 7 and outer valve element 31 in the same manner as in the first embodiment.

Specifically, the hydraulic fluid flow passages in the housing 7 are constituted by a connecting port 7A connected with the hydraulic fluid discharge pump 42, a connecting port 7C connected with one of the oil chambers 22 of the hydraulic cylinder 20, and a connecting port 7D connected with the other oil chamber 23, and have openings in the inner and outer circumferences of the housing 7. Furthermore, a connecting port 7B connected to the tank 43 is also formed in the housing 7.

The hydraulic fluid flow passages in the sealing body 310 are constituted by a hydraulic fluid flow passage 310A which communicates with the connecting port 7A, a hydraulic fluid flow passage 310C which communicates with the connecting port 7C, and a hydraulic fluid flow passage 310D which communicates with the connecting port 7D, and have openings in the inner and outer circumferences of the sealing body 310. Furthermore, a flow passage 310B which communicates with the connecting port 7B is also formed in the sealing body 310.

The hydraulic fluid flow passages in the outer valve element 31 are constituted by a hydraulic fluid flow passage 31A which communicates with the flow passage 310C in order to connect the first groove 48 with the one 22 of the oil chambers, a hydraulic fluid flow passage 31B which communicates with the flow passage 310D in order to connect the first groove 48 with the other oil chamber 23, and a hydraulic fluid flow passage 31C which communicates with the flow passage 310A in order to connect the second groove 49 with the pump 42, and have openings in the inner and outer circumferences of the outer valve element 31.

A plurality of sealing rings 311 (four sealing rings in the present embodiment) made of elastic material are interposed between the inner circumference of the housing 7 and the outer circumference of the sealing body 310 with spaces in the axial direction. The openings of the connecting ports 7A, 7C and 7D in the inner circumference of the housing 7, and the openings of the hydraulic fluid flow passages 310A, 310C and 310D in the outer circumference of the sealing body 310 are disposed between these sealing rings 311 in the axial direction. The respective sealing rings 311 are fitted in circumferential grooves formed in the outer circumference of the sealing body 310, and contact the inner circumferential surface of the housing 7 formed along a cylinder.

A slight gap in the radial direction is formed between the inner circumferential surface of the sealing body 310 formed along a cylinder and the outer circumferential surface of the outer valve element 31 formed along a cylinder. It is sufficient if this gap in the radial direction is set so that the hydraulic fluid does not leak from between the hydraulic fluid flow passages 310A, 310C, 310D of the sealing body 310 and the hydraulic fluid flow passages 31A, 31B, 31C of the outer valve element 31. For example, this gap is set at approximately 5 μm to 25 μm in accordance with the value of pressure and type of the hydraulic fluid. The remaining construction is the same as in the first embodiment.

In the abovementioned fourth embodiment, as a result of forming of the slight gap in the radial direction between the inner circumference of the sealing body 310 and the outer circumference of the outer valve element 31, it is possible to prevent the rotation of the outer valve element 31 from being impeded by friction. Furthermore, as a result of sealing rings 311 made of elastic material being interposed between the inner circumference of the housing 7 and the outer circumference of the sealing body 310, the concentric alignment of the outer valve element 31 and the bearings 8 or the like supporting the input and output shafts 2 and 3 can be ensured by the elastic deformation of the sealing rings 311. Accordingly, increase in the hysteresis of the steering assist force to variations in the steering angle and fluctuations in the steering assist force can be prevented without impeding assembly, so that the feeling of steering can be improved. Otherwise, the same functions and effects as in the first embodiment can be obtained.

FIGS. 14 through 17C illustrate a fifth embodiment of the present invention. In this fifth embodiment, first through third supporting parts 451, 452 and 453 and a swinging member 454 which differ from the first embodiment are provided. Below, parts which are the same as in the first embodiment are indicated by the same reference numerals, and points of difference are described.

The first supporting part 451 of the fifth embodiment is constituted by a recessed part formed in an arm 2' which protrudes from the outer circumference of the input shaft 2. The inner circumferential surface of this recessed part is formed along a cylindrical surface having an axis parallel to the axis of the input shaft 2. The bottom surface of this recessed part faces one end of the outer valve element 31. The recessed part which constitutes the first supporting part 451 is formed by closing one end of a through-hole formed in the arm 2' by means of a plug 2b. As a result, the first supporting part 451 is an integral part of the input shaft 2, and relative displacement of the first supporting part 451 in the axial direction to the input and output shafts 2 and 3 is restricted.

The second supporting part 452 of the fifth embodiment has a receiving part 456 and a moving body 55 which is the same as that of the first embodiment. The receiving part 456 has a cylindrical shape, and the axis of the receiving part 456 is perpendicular to the axis of the input and output shafts 2 and 3. The receiving part 456 is integrated with the moving boy 55 by being press-fitted in the retaining hole 55c formed in the moving body 55. As a result, relative movement of the second supporting part 452 in the axial direction to the input and output shafts 2 and 3 is generated by the movement of the moving body 55.

The third supporting part 453 of the fifth embodiment is constituted by a recessed part formed in one end of the outer valve element 31. The inner circumferential surface of this recessed part is formed along a cylindrical surface having an axis that is parallel to the axis of the input shaft 2. The bottom surface of this recessed part faces the arm 2' of the input shaft 2. As a result, the third supporting part 453 is integrated with the outer valve element 31, so that relative displacement of the third supporting part 453 in the axial direction to the outer valve element 31 is restricted.

As shown in FIGS. 17A through 17C, the swinging member 454 of the fifth embodiment has a body 454a like a rectangular parallelepiped, one end part 454b integrated with one end of the body 454a, and the other end part 454c integrated with the other end of the body 454a. A slot 454a' is formed in the body 454a. Each of the one end part 454b and the other end part 454c has outer surface which conforms to a spherical surface. The center line 454A of the swinging member 454 passes through the center 454b' of the spherical surface to which the outer surface of the one end part 454b conforms and the center 454c' of the spherical surface to which the outer surface of the other end part 454c conforms. Furthermore, this center line runs along the longitudinal direction of the slot 454a'. The other end part 454c has a center hole 454d which runs along the center line 454A of the swinging member 454, and a step 454c" is formed in the outer circumference of the other end part 454c.

Figure 15:
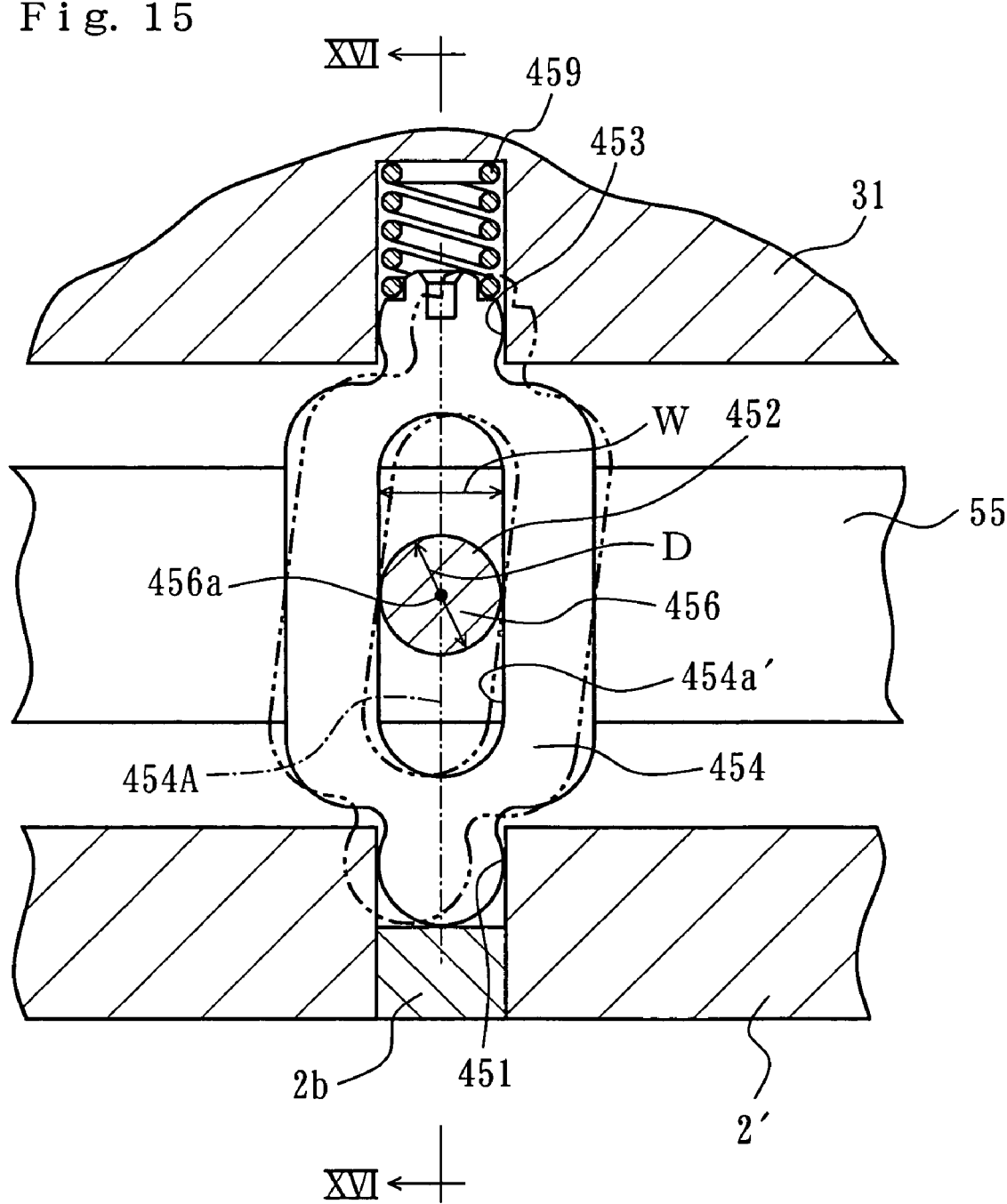
FIG. 15 is a partial enlarged longitudinal sectional view of the moving body, receiving part and swinging member in the hydraulic power steering apparatus of the fifth embodiment of the present invention.
Figure 16:
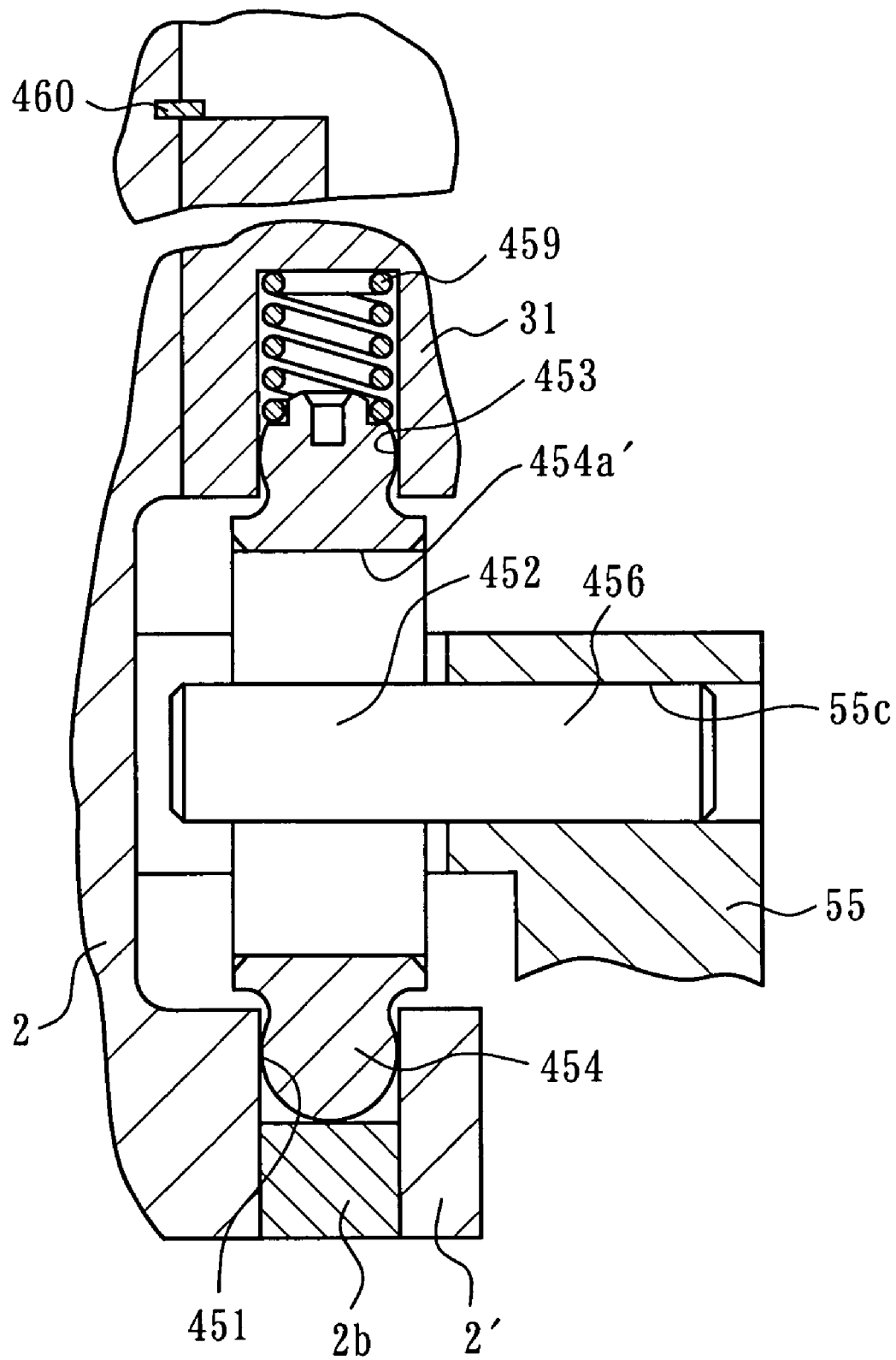
FIG. 16 is a sectional view along line XVI—XVI in FIG. 15.

The swinging member 454 is supported by the first supporting part 451 and the second supporting part 452 so as to swing in accordance with the relative rotation between the input and output shafts 2 and 3, and is supported by the third supporting part 453 so that relative rotation of the outer valve element 31 to the inner valve element 32 is generated by the swinging of this swinging member 454. The one end part 454b of the swinging member 454 is fitted in the recessed part which constitutes the first supporting part 451 so as to be capable of swinging, and the one end part 454b contacts the inner circumferential surface of this recessed part so as to rotate together with the first supporting part 451. The other end part 454c of the swinging member 454 is fitted in the recessed part which constitutes the third supporting part 453 so as to be capable of swinging, and the other end part 454c contacts the inner circumferential surface of this recessed part so as to rotate together with the third supporting part 453. The receiving part 456 is inserted into the slot 454a' of the swinging member 454. As a result, the swinging member 454 is supported by the second supporting part 452 via the inner circumference of the slot 454a' and the outer circumference of the receiving part 456. The center line 454A of the swinging member 454 crosses the axis 456a of the receiving part 456. The width W of the slot 454a' is set at a slightly larger dimension than the diameter D of the receiving part 456, so that the receiving part 456 is inserted into the slot 454a' with a gap left; for example, this gap is set at 0.003 mm. As a result, the swinging member 454 can move in the longitudinal direction of the slot 454a' and swing relatively to the receiving part 456. For example, the swinging member 454 indicated by the solid line in FIG. 15 is caused to swing as indicated by the two-dot chain line by the relative rotation between the input and output shafts 2 and 3. As a result of the swinging of this swinging member 454, the angle formed by the center line 454A of the swinging member 454 and the axis 456a of the receiving part 456 varies.

The other end of the swinging member 454 is fitted in the recessed part which constitutes the third supporting part 453 so as to movable in the axial direction of the input and output shafts 2 and 3. Therefore, relative displacement of the swinging member 454 in the axial direction of the input and output shafts 2 and 3 to the third supporting part 453 is possible. A compression spring 459 as an elastic member is interposed between the third supporting part 453 and the swinging member 454. The outer valve element 31 is pressed against the snap ring 460 fastened to the input shaft 2 by elastic force applied by the compression spring 459. As a result, variation of distance between the first supporting part 451 and the third supporting part 453 in the axial direction of the input and output shafts 2 and 3 is restricted. Further, since the looseness of the outer valve element 31 in the axial direction is prevented, application of elastic force by compression spring 59 as seen in the first embodiment is not needed. The compression spring 459 is elastically deformed in accordance with the relative displacement of the swinging member 454 in the axial direction of the input and output shafts 2 and 3 to the third supporting part 453 by the swinging of the swinging member 454. The remaining construction is the same as in the first embodiment.

In the abovementioned fifth embodiment, since the receiving part 456 is integrated with the moving body 55 by being press-fitted in the retaining hole 55c, there is no relative displacement to the moving body 55. Accordingly, looseness of the swinging member 454 to the second supporting part 452 can be suppressed by minimizing the difference between the width W of the slot 454a' of the swinging member 454 and the diameter D of the receiving part 456. As a result, fluctuations in the steering assist force generated according to the relative rotation between the two valve elements 31 and 32 caused by the swinging of the swinging member 454 can be reduced, so that fluctuations in the steering torque can be suppressed. Furthermore, since the inner circumferential surfaces of the recessed parts constituting the first supporting part 451 and the third supporting part 453 conform to cylindrical surfaces, and the one end part 454b and the other end part 454c of the swinging member 454 are supported by these cylindrical surfaces via outer surfaces which conform to spherical surfaces, the supporting rigidity can be improved. Moreover, since the recessed part which constitutes the first supporting part 451 is formed by closing one end of the through-hole formed in the arm 2' by means of the plug 2b, machining is facilitated, and the dimensional precision of the first supporting part 451 can be improved. Further, even if the relative displacement of the swinging member 454 in the axial direction of the input and output shafts 2 and 3 to the third supporting part 453 is generated by the swinging of the swinging member 454, this relative displacement is absorbed by the elastic deformation of the compression spring 459. Therefore, looseness of the outer valve element 31 is prevented, and the swinging member can be smoothly swung without generating rubbing at the respective supporting parts 451, 452, 453. Otherwise, the same functions and effects as in the first embodiment can be obtained.

The present invention is not limited to the abovementioned embodiments. For example, the vehicle operating condition is not limited to the vehicle speed, the ratio of the relative rotation angle between the two valve elements to the relative rotation angle between the input and output shafts can also be varied in accordance with another operating condition such as steering angle and others. Furthermore, in the first and fifth embodiments, it is possible to restrict the relative displacement of the second supporting part in the axial direction to the input and output shafts, and to cause relative displacement of the first supporting part in the axial direction to the input and output shafts by means of the rotation ratio altering mechanism. Furthermore, in the first through fourth embodiments, as seen in the fifth embodiment, it is possible that relative displacement of one of the first supporting part and the second supporting part in the axial direction to the input and output shafts is restricted, while the other of the supporting parts is displaced relatively to the input and output shafts in the axial direction by the rotation ratio altering mechanism, that relative displacement of the third supporting part in the axial direction to the outer valve element is restricted, that variation of distance between the third supporting part and the one of the first supporting part and the second supporting part in the axial direction of the input and output shafts is restricted, that relative displacement of the third supporting part to the swinging member in the axial direction of the input and output shafts is made possible, that an elastic member is interposed between the third supporting part and the swinging member, and that the elastic member is elastically deformed in accordance with the relative displacement of the swinging member in the axial direction of the input and output shafts to the third supporting part by the swinging of the swinging member.

What is claimed is:

1. A hydraulic power steering apparatus comprising:
   an input shaft;
   an output shaft;
   a torsion bar which connects said input shaft with said output shaft coaxially so that elastic relative rotation between said shafts is generated in accordance with steering torque;
   a hydraulic actuator for generating steering assist force;
   a hydraulic control valve having a tubular outer valve element and an inner valve element which is fitted into said outer valve element so as to be capable of relative coaxial rotation;
   a rotation conversion mechanism which converts the relative rotation between said input and output shafts into relative rotation between said two valve elements; and
   a rotation ratio altering mechanism which varies the ratio of the relative rotation angle between said two valve elements to the relative rotation angle between said input and output shafts in accordance with an operating condition of a vehicle;
   wherein the pressure of the hydraulic fluid supplied to said hydraulic actuator is controlled in accordance with the relative rotation angle between said two valve elements,
   said outer valve element is capable of relative coaxial rotation to said input shaft and said output shaft,
   said inner valve element is formed integrally with said input shaft,
   said rotation conversion mechanism has a first supporting part which rotates together with said input shaft, a second supporting part which rotates together with said output shaft, a third supporting part which rotates together with said outer valve element, and a swinging member,
   the respective supporting parts are spaced from each other in the axial direction of said input and output shafts,
   said swinging member is supported by said first supporting part and said second supporting part so as to swing in accordance with the relative rotation between said input and output shafts, and is supported by said third supporting part so that relative rotation between said outer valve element and said inner valve element is generated by the swinging of said swinging member, and
   relative displacement of one of said first, second and third supporting parts in the axial direction to said input and output shafts by a distance corresponding to the operating condition of the vehicle is generated by means of said rotation ratio altering mechanism.

2. The hydraulic power steering apparatus according to claim 1, wherein
   relative displacement of one of said first supporting part and said second supporting part in the axial direction to said input and output shafts is restricted, while the other of said supporting parts is displaced relatively to said input and output shafts in the axial direction by said rotation ratio altering mechanism,
   relative displacement of said third supporting part in the axial direction to said outer valve element is restricted,
   relative displacement of the one of said first supporting part and said second supporting part to said swinging member and relative displacement of said third supporting part to said swinging member are restricted in the axial direction of said input and output shafts, and
   relative displacement of said outer valve element in the axial direction to said inner valve element is made possible, so that variation of distance between said third supporting part and the one of said first supporting part and said second supporting part in the axial direction of said input and output shafts is allowed by the swinging of said swinging member.

3. The hydraulic power steering apparatus according to claim 1, wherein
   relative displacement of one of said first supporting part and said second supporting part in the axial direction to said input and output shafts is restricted, while the other of said supporting parts is displaced relatively to said input and output shafts in the axial direction by said rotation ratio altering mechanism,
   relative displacement of said third supporting part in the axial direction to said outer valve element is restricted,
   variation of distance between said third supporting part and the one of said first supporting part and said second supporting part in the axial direction of said input and output shafts is restricted,
   relative displacement of said swinging member to said third supporting part in the axial direction of said input and output shafts is made possible,
   an elastic member is interposed between said third supporting part and said swinging member, and
   said elastic member is elastically deformed in accordance with the relative displacement of said swinging member in the axial direction of said input and output shafts to said third supporting part by the swinging of said swinging member.

4. The hydraulic power steering apparatus according to claim 1, wherein
   the supporting part which is displaced in the axial direction by said rotation ratio altering mechanism has a moving body which is capable of relative movement in the axial direction to said input and output shafts, and a receiving part which is held by said moving body so as to be able to rotate about an axis perpendicular to the axis of said input and output shafts, and
   said swinging member is supported by the supporting part which is displaced in the axial direction by said rotation ratio altering mechanism via said receiving part.

5. The hydraulic power steering apparatus according to claim 1, wherein
   the supporting part which is displaced in the axial direction by said rotation ratio altering mechanism has a moving body which is capable of relative movement in the axial direction to said input and output shafts, and a receiving part which has an axis perpendicular to the axis of said input and output shafts and is integrated with said moving body, said swinging member has a slot, said receiving part is inserted into said slot with a gap, and said swinging member is supported by the supporting part which is displaced in the axial direction by said rotation ratio altering mechanism via the inner circumference of said slot and the outer circumference of said receiving part.

6. The hydraulic power steering apparatus according to any of claims 1 through 3, wherein the supporting part which is displaced in the axial direction by said rotation ratio altering mechanism has a moving body which is capable of relative movement in the axial direction to said input and output shafts, a circumferential groove which is concentric with said input and output shafts is formed in the outer circumference of said moving body, said rotation ratio altering mechanism has a connecting member of which relative movement in the axial direction to said input and output shafts is generated in accordance with the operating condition of the vehicle, and said connecting member is inserted into said circumferential groove via a rolling bearing which has an axis perpendicular to the axis of said input and output shafts.

7. The hydraulic power steering apparatus according to claim 4 or claim 5, wherein a circumferential groove which is concentric with said input and output shafts is formed in the outer circumference of said moving body, said rotation ratio altering mechanism has a connecting member which performs relative movement to said input and output shafts in the axial direction in accordance with operating condition of the vehicle, and said connecting member is inserted into said circumferential groove via a rolling bearing which has the axis perpendicular to the axis of said input and output shafts.

8. The hydraulic power steering apparatus according to any of claims 1 through 5, wherein one of said input shaft, said output shaft, and said outer valve element rotates together with the supporting part which is displaced in the axial direction by said rotation ratio altering mechanism, and is connected with the supporting part which is displaced by said rotation ratio altering mechanism in the axial direction via grooves formed along the axial direction of said input and output shafts and balls rotatably inserted into said groove so that relative movement in the axial direction of said input and output shafts is allowed.

9. The hydraulic power steering apparatus according to any of claims 1 through 5, wherein said second supporting part is disposed between said first supporting part and said third supporting part in the axial direction of said input and output shafts.

10. The hydraulic power steering apparatus according to any of claims 1 through 5, comprising:

a housing; and a cylindrical sealing body which is inserted into said housing, wherein said outer valve element is inserted into said sealing body so that relative coaxial rotation is possible, hydraulic fluid passages are formed in said housing, said sealing body and said outer valve element, a plurality of sealing rings made of elastic material are interposed between the inner circumference of said housing and the outer circumference of said sealing body with spaces left in the axial direction, openings of said hydraulic fluid passages in the inner circumference of said housing and openings of said hydraulic fluid passages in the outer circumference of said sealing body are disposed between said plurality of sealing rings in the axial direction, a slight gap in the radial direction is formed between the inner circumferential surface of said sealing body and the outer circumferential surface of said outer valve element, and said gap in the radial direction is set so that there is no leakage of hydraulic fluid from between said hydraulic fluid passages of said sealing body and said hydraulic fluid passages of said outer valve element.

\* \* \* \* \*